United States Patent
Okawahara et al.

(10) Patent No.: US 7,346,112 B2
(45) Date of Patent: Mar. 18, 2008

(54) METHOD OF AND APPARATUS FOR DECODING AND DISPLAYING VIDEO THAT IMPROVES QUALITY OF THE VIDEO

(75) Inventors: Ryohei Okawahara, Tokyo (JP); Akihiko Takabatake, Tokyo (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 751 days.

(21) Appl. No.: 10/730,907

(22) Filed: Dec. 10, 2003

(65) Prior Publication Data

US 2004/0228412 A1    Nov. 18, 2004

(30) Foreign Application Priority Data

May 16, 2003  (JP)  ............................. 2003-139400

(51) Int. Cl.
*H04N 7/12* (2006.01)
(52) U.S. Cl. ............ 375/240.25; 375/240; 375/240.01; 375/240.12
(58) Field of Classification Search ................ 375/240, 375/240.01, 240.12, 240.25; 348/715, 716
See application file for complete search history.

(56) References Cited

U.S. PATENT DOCUMENTS 5,907,372 A * 5/1999 Oku et al. .................. 348/716
6,356,317 B1 * 3/2002 Watabe et al. .............. 348/715

FOREIGN PATENT DOCUMENTS

JP       8-107482 A    4/1996
JP       9-284779 A   10/1997

\* cited by examiner

*Primary Examiner*—Allen Wong
(74) *Attorney, Agent, or Firm*—Buchanan Ingersoll & Rooney PC

(57) ABSTRACT

The frame-memory control-section partitions a frame memory into a plurality of sectors and stores decoded video data of frames not used as predictive video in the frame memory. The frame-memory control-section writes a top-field data and a bottom-field data of the decoded video data into separate free sectors of the frame memory. In reading and displaying the decoded video data from the frame memory, the frame-memory control-section simultaneously releases the sector that stores the top-field data and the sector that stores the bottom-field data during the last display field period of the display video.

5 Claims, 15 Drawing Sheets

METHOD OF AND APPARATUS FOR DECODING AND DISPLAYING VIDEO THAT IMPROVES QUALITY OF THE VIDEO

BACKGROUND OF THE INVENTION

1) Field of the Invention

The present invention relates to a method of and an apparatus for decoding and displaying video data of an encoded motion picture.

2) Description of the Related Art

The encoding of a motion picture is carried out based on the MPEG-2 (Moving Picture Experts Group 2) as the international standard. In the video decoding and displaying apparatus that decodes video data of an encoded motion picture and displays the decoded video, how to use a frame memory is important. Various kinds of proposals have been made so far regarding methods:of controlling the frame memory. For example, Japanese Patent Application Laid-open Publication No. 8-107482, and Japanese Patent Application Laid-open Publication No. 9-284779 disclose such methods.

The conventional method of controlling the frame memory will be now explained with reference to FIG. 12 to FIG. 15. FIG. 12 is a block diagram of a conventional video decoding and displaying apparatus. FIG. 13 is an illustration of a relationship between video data and sectors in a bank #2 of the frame memory shown in FIG. 12. FIG. 14 is a block diagram of a sector managing apparatus in a frame-memory control-section (that is, a frame memory interface) shown in FIG. 12. FIG. 15 is a time chart of an operation of the conventional video decoding and displaying apparatus in a one-sector release mode, and explains about a transition of a used quantity of sectors.

The conventional video decoding and displaying apparatus includes a sequencer (SEQ) 101, a video decoding-section (VDEC) 102, a frame-memory control-section (FIF) 103, a frame memory 104, and a video interface section (VIF) 105. The dotted line arrows illustrate flow of video data, and thin solid line arrows illustrate control instructions or control information signals.

The sequencer 101 controls each section of the video decoding and displaying apparatus according to operation mode instructions from the outside. In other words, the sequencer 101 outputs a control instruction (a) to the video decoding-section 102, thereby to instruct the video decoding-section 102 to start or stop video decoding. The sequencer 101 receives frame-memory management information (b) that includes a display output line and sector management information, from the frame-memory control-section 103. The sequencer 101 outputs a control instruction (c) to the frame-memory control-section 103, thereby to instruct the frame-memory control-section 103 to write a decoded video into a bank, or read a display video from a bank, or manage a sector of the bank #2.

The video decoding-section 102 decodes encoded video data that is input from the outside, and outputs the generated decoded video data to the frame-memory control-section 103. The frame-memory control-section 103 writes the decoded video data transferred from the video decoding-section 102, into the frame memory 104. The frame-memory control-section 103 also reads the decoded video data from the frame memory 104, and outputs this data to the video interface section 105. The video interface section 105 converts a format of the decoded video data transferred from the frame-memory control-section 103, thereby to generate display video data, and outputs this display video data to an external display apparatus.

The frame memory 104 consists of three banks (i.e., #0, #1, and #2). Each of the bank #0 and the bank #1 has a capacity to store video data of one frame component, and is used to store an I frame and a P frame that are used as predicted videos. The bank #2 is used to store a frame not used for a predicted video, that is, a B frame in a normal video reproduction. The bank #2 is managed by being divided into a plurality of sectors (i.e., a sector #0 to a sector #m) as shown in FIG. 12. A divided number of sectors can be variable set in a capacity of at least 0.5 frame.

FIG. 13 illustrates a relationship between video data and sectors in the bank #2 of the frame memory 104. FIG. 13 is an illustration of this relationship corresponding to an NTSC (National Television System Committee) size, where the resolution of one frame is 720 pixels by 480 pixels.

As shown in FIG. 13, 16 pixels in top-field (top) eight lines, and 16 pixels in bottom-field (bottom) eight lines constitute a macro block 120. The macro block 120 is the smallest unit for encoding data.

One sector of the top field (top) constitutes 720 pixels in the top-field eight lines. Moreover, one sector of the bottom-field (bottom) constitutes 720 pixels in the bottom field (bottom) eight lines. Data of 45 macro blocks (hereinafter "macro block lines") are stored in a horizontal direction, using each one sector as a unit.

The frame-memory control-section 103 includes a sector managing apparatus shown in FIG. 14. The sector managing apparatus writes decoded video into and read decoded video from the bank #2 of the frame memory 104 respectively.

The sector managing apparatus includes a sector managing circuit 131, and a sector management table 132. The sector management table 132 holds a plurality of sector information (#0 to #m). Each sector information includes vertical address information (i.e., a vertical address) 133 in the frame of the video data stored in the sector, field parity information (i.e., top or bottom) 134 that indicates whether the field is a top field or a bottom field, frame number information (i.e., a frame number) 135 that is used to identify a frame number when data of two frames coexist in the bank #2, and used-flag information (i.e., used flag) 136 that indicates whether a sector is free or in use.

The sector managing apparatus operates in a fixed mapping mode and a dynamic mapping mode. As the present invention relates to the dynamic mapping mode, only the dynamic mapping mode will be explained.

When the sector managing apparatus is operating in the dynamic mapping mode, the sector managing circuit 131 searches the sector management table 132 for an unused sector to write new macro block lines of decoded video data into the frame memory 104. The sector managing circuit 131 outputs a sector number of the unused sector to the outside. Moreover, the sector managing circuit 131 updates sector management information corresponding to this sector, and sets this sector to be in use. This operation is called a sector allocation.

The frame-memory control-section 103 converts the unused sector number obtained by the searching, into a writing position of the frame memory 104, and writes the decoded video data into this position. To read the video data to be displayed, the frame-memory control-section 103 searches the sector management table 132 for a sector that stores the video data corresponding to the display line. The frame-memory control-section 103 outputs a sector number of the obtained sector to the outside, reads the display data from this sector, and outputs this display data. Upon completing the outputting of all the data, the frame-memory control-section 103 resets the used flag of this sector. This resetting operation is called a sector release. The sector managing circuit 131 manages the information of a number of used sectors, and outputs a flag (i.e., a sector full flag) that indicates whether all the sectors are being used, to the outside.

FIG. 15 illustrates a relationship between a decoded frame, a display frame, a decoding bank, a display bank, a sector initialization instruction, a sector allocation instruction, a sector release instruction, and a used quantity of sectors, for each of field periods from T0 to T15.

In the upper part of FIG. 15, "top" and "bot" denote field parities of a video output respectively. "I" denotes an Intra-coded frame (i.e., an I frame) that is encoded within a frame with no intra-frame predictive coding. "P" denotes a Predictive-coded frame (i.e., a P frame) that is intra-frame predictive coded in one direction. The P frame has an intra-frame predictive coding from the preceding I frame or P frame. "B" denotes a Bidirectional predictive-coded frame (i.e., a B frame) that is intra-frame predictive coded in both directions. The B frame has an intra-frame predictive coding from the preceding and following I frame or P frame.

A number (*) attached next to each of I, P, and B denotes a display order of the frame. "I*t" and "I*b" denote a top field of the I* frame and a bottom field of the I* frame respectively. Similarly, "P*t" and "P*b" denote a top field of the P* frame and a bottom field of the P* frame respectively. Also, "B*t" and "B*b" denote a top field of the B* frame and a bottom field of the B* frame respectively.

The "decoding bank" denotes a bank of the frame memory 104 into which the decoded frame is written. In the example shown in FIG. 15, the I2 frame is instructed to be written into the bank #0, and the P5 frame is instructed to be written into the bank #1. As shown in FIG. 15, as none of the B frames are used for the predictive video, all the B frames are instructed to be written into the bank #2.

The "display bank" denotes a bank from which the video data is read to carry out a display. In the example shown in FIG. 15, at the time of displaying the I2 frame after displaying the B1 frame, the I2 frame is stored in the bank #0. Therefore, the bank #0 is instructed as the "display bank".

The "sector allocation instruction" is a control signal that is output from the sequencer 101 to the frame-memory control-section 103. The "sector allocation instruction" becomes at a "1" level during a field period when the decoded video is written into the frame memory 104, and becomes at a "0" level during a field period when the decoded video is not written into the frame memory 104. In FIG. 15, all the frames are decoded during every two field periods. Therefore, the "sector allocation instruction" is always at the "1" level.

When the "sector allocation instruction" is at the "1" level, the frame-memory control-section 103 searches the sector management table 132 for a free sector, and writes the decoded video data into this free sector. At the same time, the frame-memory control-section 103 rewrites the state of the writing section into a busy state, and updates the writing video information such as the video position and the field parity, in the sector management table 132.

The "sector release instruction" is a control signal that is output from the sequencer 101 to the frame-memory control-section 103. During a dynamic mapping mode, the frame-memory control-section 103 releases the sector according to the "sector release instruction". Specifically, the "sector release instruction" changes in the unit of one field period. During a display field period when the "sector release instruction" is at the "1" level, the frame-memory control-section 103 releases the sector when all the data of the sector are output to be displayed. On the other hand, during a display field period when the "sector release instruction" is at the "0" level, the frame-memory control-section 103 does not release the sector, and holds the data. In FIG. 15, as the "sector release instruction" is always at the "1" level, the frame-memory control-section 103 releases a sector at every one sector.

The decoding of the B9 frame starts during the field period T2. As the "sector allocation instruction" is at the "1" level, the decoding of both the top and bottom fields progresses. The decoded data are sequentially written into free sectors of the bank #2. At the same time, information about the writing sector is updated in the sector management table 132.

As a result, the number of busy sectors increases. At the end of the field period T2, about a half of the data is decoded in each field. Therefore, total number of busy sectors corresponds to about one field. The frame-memory control-section 103 starts writing the B9 frame immediately after the sector is initialized by the "sector initialization instruction" at the starting time of the field period T1. Therefore, the frame-memory control-section 103 starts writing all the data of the B9 frame in the state that the sector is free.

In the next field period T3, the B9 frame is continuously decoded, and the top field B9t of the B9 field is displayed. To read the display data from the frame memory 104, the frame-memory control-section 103 searches for a sector that stores the data of the top field B9t, and displays the data. In this case, the "sector release instruction" is at the "1" level. Therefore, at a point of time when the frame-memory control-section 103 completes reading the whole data within the sector, the frame-memory control-section 103 updates the information about the sector in the sector management table 132, and releases this sector as a free sector.

The frame-memory control-section 103 continuously decodes the data of the top field B9t of the B9 frame, and at the same time, reads the data of one field during the field period T3. Therefore, the used quantity of the sector finally becomes zero at the end of the field period T3. On the other hand, the frame-memory control-section 103 finishes the decoding, and does not start the display, of the data of the bottom field B9t of the B9 frame. Therefore, the frame-memory control-section 103 is still using the sector of one field component.

In the next field period T4, the frame-memory control-section 103 decodes the next B10 frame, and at the same time, displays the bottom field B9b of the B9 frame. Both the "sector allocation instruction" and the "sector release instruction" are at the "1" level. Therefore, the frame-memory control-section 103 carries out both the writing of the decoded video into the sector and the reading of the display data from the sector, in a similar manner to that for the B9 frame. Consequently, the number of sectors used for the data of the bottom field B9b of the B9 frame gradually decreases along the progress of the display. At the same time, the number of sectors used for the data of both the top field B10t and the bottom field B10b of the B10 frame gradually increases.

In the next field period T5, the frame-memory control-section 103 continuously decodes the B10 frame, and at the same time, displays the top field B10t of the B10 frame. Therefore, the number of sectors used for the data of the top field B10t of the B10 frame gradually decreases. At the end of the field period T5, only the data of the bottom field B10*b* of the B10 frame is using the sector of one field component.

In the next field period T6, the frame-memory control-section 103 does not write new decoded video data into the bank #2, and displays only the bottom field B10*b* of the B10 frame. Therefore, the frame-memory control-section 103 reads the remaining data of the bottom field B10*b*, and releases the sectors. At the end of the field period T6, the frame-memory control-section 103 completes the display, and sets all the sectors free.

During the field periods from T2 to T6, when there is no free sector in the bank #2, the frame-memory control-section 103 must stop writing the decoded video data. Therefore, the frame-memory control-section 103 outputs a sector using state to the sequencer 101. The sequencer 101 refers to the received sector using state, and when all the sectors are busy, the sequencer 101 makes the video decoding-section 102 stop decoding.

The conventional method is advantageous in that a frame memory, which is necessary for decoding and displaying a video, of lower capacity is sufficient. The data during the field period after finishing the display is released during this field period. Therefore, when the display video is an interlace material, there is no problem. However, when the display video is a progressive material, it is not possible to display the video in an optimum format.

Further, in the conventional method, it is not possible to display a picture of an SIF size in an enlarged size. Therefore, it is not possible to continuously decode and display various videos in the dynamic mapping mode.

SUMMARY OF THE INVENTION

It is an object of the present invention to solve at least the problems in the conventional technology.

According to the present invention, a frame memory that is used to store decoded video data of a frame not used as a predicted video, is partitioning into a plurality of sectors. A top-field data and a bottom-field data of the decoded video data are stored into separate free sectors of the frame memory. At the time of displaying the decoded video data by reading it from the frame memory, during a last display field period of a display video, the sector that stores the top-field data and the sector that stores the bottom-field data are simultaneously released when the sector capacity of the frame memory is equal to or grater than that required for one frame of video data to be displayed.

The other objects, features and advantages of the present invention are specifically set forth in or will become apparent from the following detailed descriptions of the invention when read in conjunction with the accompanying drawings.

DETAILED DESCRIPTION

Exemplary embodiments of the method and apparatus for decoding and displaying video according to the present invention will be explained in detail below with reference to the accompanying drawings.

Figure 1:
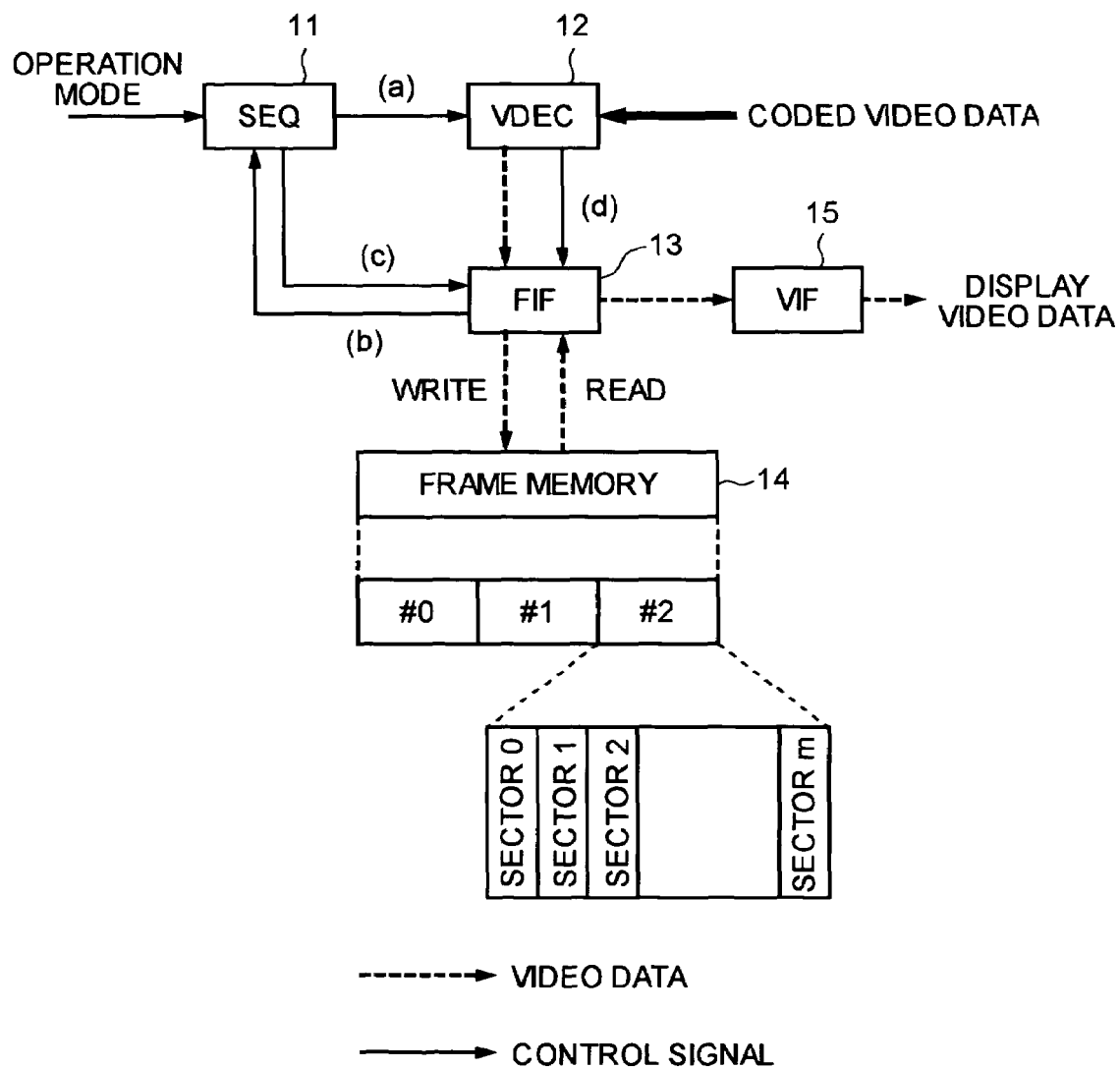
FIG. 1 is a block diagram of a video decoding and displaying apparatus according to an embodiment of the present invention.

FIG. 1 is a block diagram of a video decoding and displaying apparatus according to an embodiment of the present invention. The video decoding and displaying apparatus includes a sequencer 11, a video decoding-section 12, a frame-memory control-section 13, a frame memory 14, and a video interface section 15. Dotted line arrows indicate flow of video data, and thin solid line arrows indicate control instructions or control related information signals.

The sequencer 11 controls each section of the video decoding and displaying apparatus according to operation mode instructions from the outside. In other words, the sequencer 11 outputs a control instruction (a) to the video decoding-section 12, thereby to instruct the video decoding-section 12 to start or stop video decoding. The sequencer 11 receives frame-memory management information (b) that includes a display output line and sector management information, from the frame-memory control-section 13. The sequencer 11 outputs a control instruction (c) to the frame-memory control-section 13, thereby to instruct the frame-memory control-section 13 to write a decoded video into a bank, or read a display video from a bank, or manage a sector of the bank #2.

The video decoding-section 12 decodes encoded video data that is input from the outside, and outputs the generated decoded video data to the frame-memory control-section 13. In this case, the video decoding-section 12 outputs to the frame-memory control-section 13 a control signal (d) that shows decoded video parameters such as an attribute of a decoded video frame detected in the decoding processing, a picture size, a picture structure, and a display mode.

The frame-memory control-section 13 writes the decoded video data transferred from the video decoding-section 12, into the frame memory 14. The frame-memory control-section 13 also reads the decoded video data from the frame memory 14, and outputs this data to the video interface section 15. The video interface section 15 converts a format of the decoded video data transferred from the frame-memory control-section 13, thereby to generate display video data, and outputs this display video data to an external display apparatus.

Figure 11:
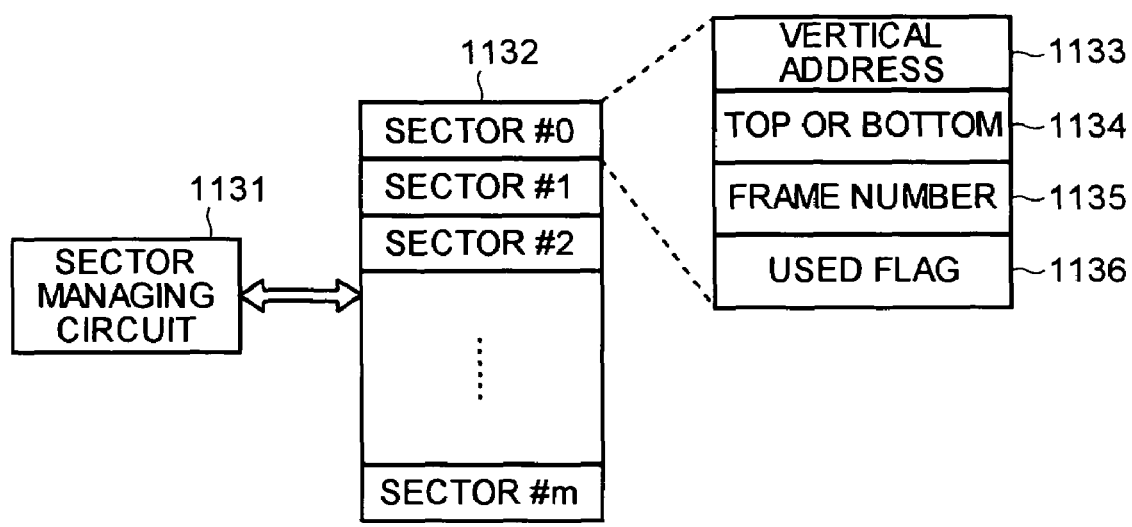
FIG. 11 is a block diagram of a sector managing apparatus in a frame-memory control-section shown in FIG. 1.
Figure 12:
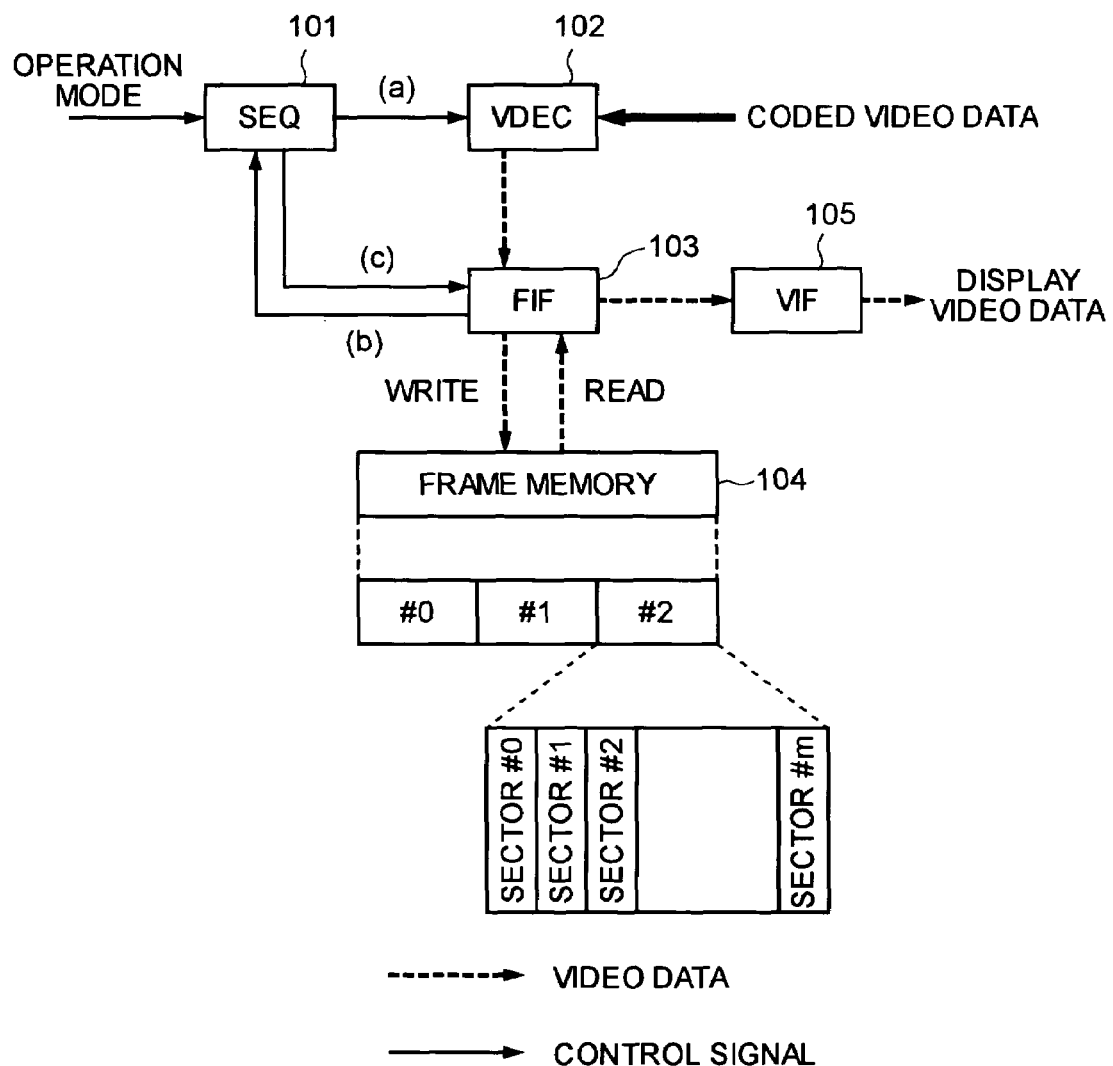
FIG. 12 is a block diagram of a conventional video decoding and displaying apparatus.
Figure 13:
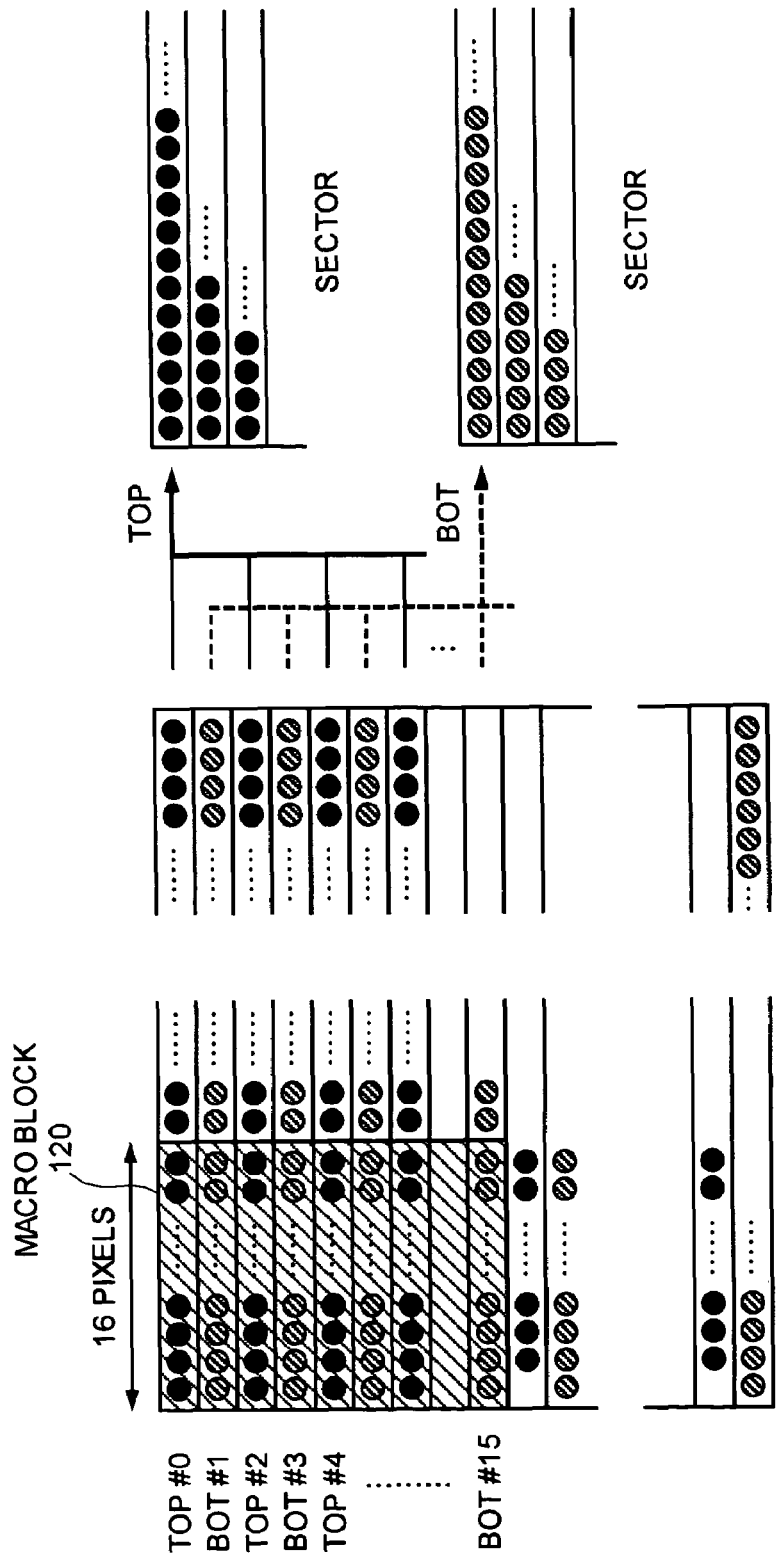
FIG. 13 is an illustration of a relationship between video data and sectors in a bank #2 of the frame memory shown in FIG. 12.
Figure 14:
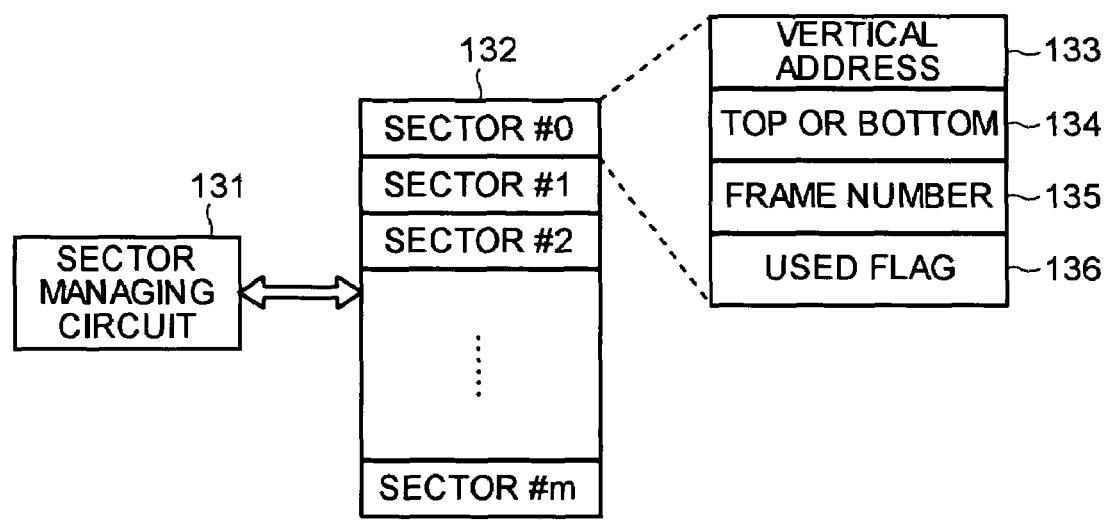
FIG. 14 is a block diagram of a sector managing apparatus in a frame-memory control-section shown in FIG. 12.
Figure 15:
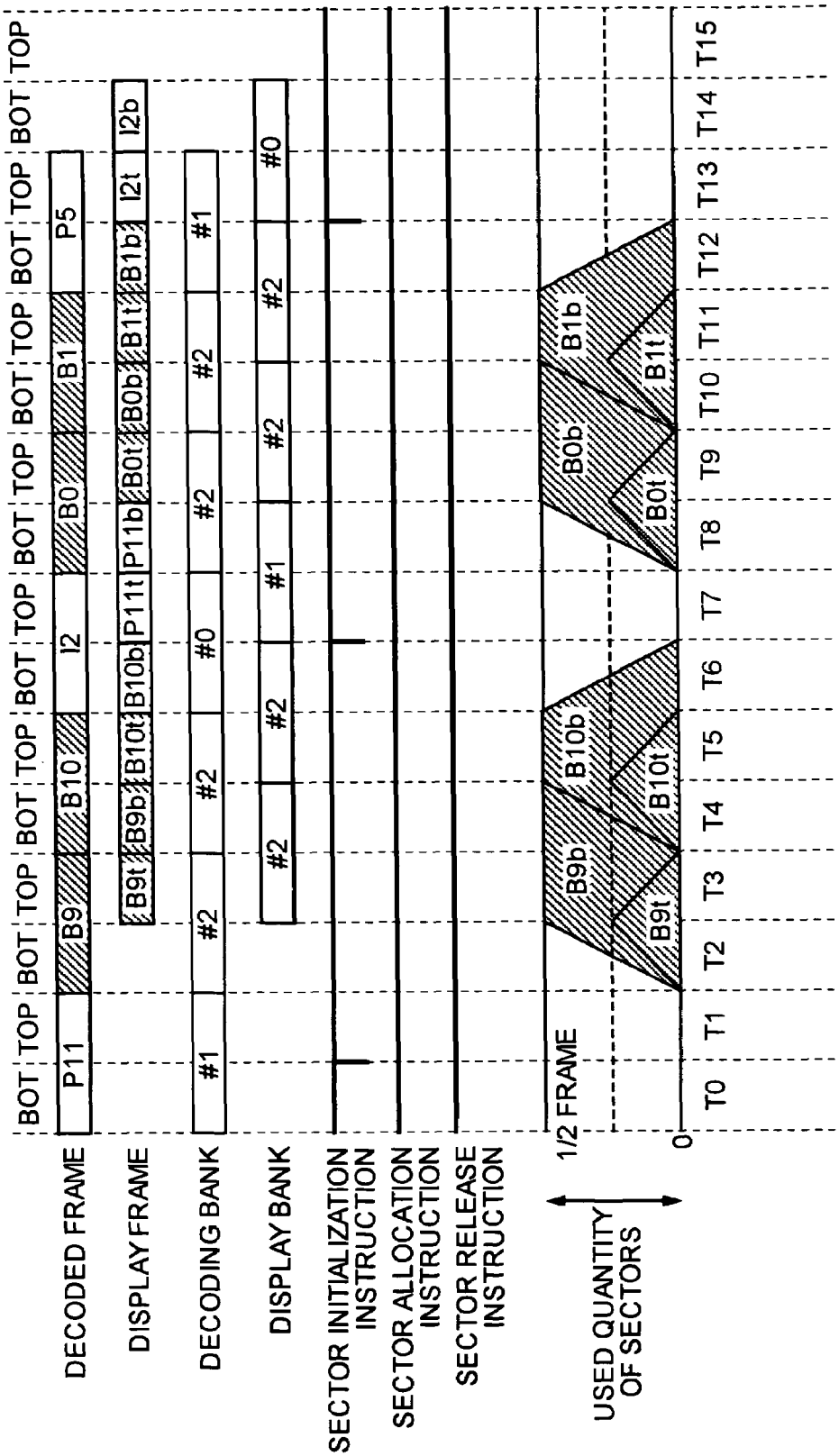
FIG. 15 is a time chart of an example of the operation that the video decoding and displaying apparatus shown in FIG. 12 carries out in a one-sector release mode, and also explains about a transition of a used quantity of sectors.

The frame-memory control-section 13 includes a sector managing apparatus shown in FIG. 11. This sector managing apparatus writes decoded video into and read decoded video from the bank #2 of the frame memory 14.

The sector managing apparatus includes a sector managing circuit 1131, and a sector management table 1132. The sector management table 1132 holds a plurality of sector information (#0 to #m). Each sector information includes vertical address information (i.e., a vertical address) 1133 in the frame of the video data stored in the sector, field parity information (i.e., top or bottom) 1134 that indicates whether the field is a top field or a bottom field, frame number information (i.e., a frame number) 1135 that is used to identify a frame number when data of two frames coexist in the bank #2, and used-flag information (i.e., used flag) 1136 that indicates whether a sector is free or in use.

The sector managing apparatus operates in a fixed mapping mode and a dynamic mapping mode. As the present invention relates to the dynamic mapping mode, only the dynamic mapping mode will be explained.

When the sector managing apparatus is operating in the dynamic mapping mode, the sector managing circuit 1131 searches the sector management table 1132 for an unused sector to write new macro block lines of decoded video data into the frame memory 14. The sector managing circuit 1131 outputs a sector number of the unused sector to the outside. Moreover, the sector managing circuit 1131 updates sector management information corresponding to this sector, and sets this sector to be in use. This operation is called a sector allocation.

The frame-memory control-section 13 converts the unused sector number obtained by the searching, into a writing position of the frame memory 14, and writes the decoded video data into this position. To read the video data to be displayed, the frame-memory control-section 13 searches the sector management table 1132 for a sector that stores the video data corresponding to the display line. The frame-memory control-section 13 outputs a sector number of the obtained sector to the outside, reads the display data from this sector, and outputs this display data. Upon completing the outputting of all the data, the frame-memory control-section 13 resets the used flag of this sector. This resetting operation is called a sector release. The sector managing circuit 1131 manages the information of a number of used sectors, and outputs a flag (i.e., a sector full flag) that indicates whether all the-sectors are being used, to the outside.

The frame memory 14 consists of three banks (i.e., #0, #1, and #2). Each of the bank #0 and the bank #1 has a capacity to store video data of one frame component, and is used to store an I frame and a P frame that are used as predicted videos. The bank #2 is used to store a frame not used for a predicted video, that is, a B frame in a normal video reproduction. The sector managing circuit shown in FIG. 11 manages the bank #2 by dividing it into a plurality of sectors (i.e., a sector #0 to a sector #m). A divided number of sectors can be variably set in a capacity of at least 0.5 frame.

The sequencer 11 can control both the fixed mapping mode and the dynamic mapping mode as an operation mode, according to an operation mode instruction from the outside. In the dynamic mapping mode, the frame-memory control-section 13 can control both the two-sector release mode and the conventional one-sector release mode, by utilizing the control signal (d) that the video decoding-section 12 generates.

The one-sector release mode is a mode in which the frame-memory control-section 13 searches for only one sector storing data of a display field period, reads the data from this sector, and thereafter resets a busy flag to this one sector. On the other hand, the two-sector release mode is a mode in which the frame-memory control-section 13 searches for two sectors storing data of the top field and the bottom field during the display field period in pairs, reads the data, and thereafter simultaneously resets busy flags to the two sectors.

Specifically, in the two-sector release mode operation, the frame-memory control-section 13 searches for two sectors that store the top field data and the bottom field data of macro block lines including display lines at the time of reading the display data corresponding to this display line, based on the vertical address information 1133, the field parity information 1134, and the frame number information 1135 in the sector management table 1132 shown in FIG. 11. The frame-memory control-section 13 reads the data in the order of the display lines from the detected two sectors.

At that time, order of the reading lines from the two sectors is determined based on the attribute (i.e., whether the progressive material or the interlace material) of the decoded video frame, the picture size (i.e., whether the SIF size picture or the normal size picture), and the display mode (i.e., whether the interlace display monitor or the progressive display monitor).

Six operation examples are explained below.

Figure 2:
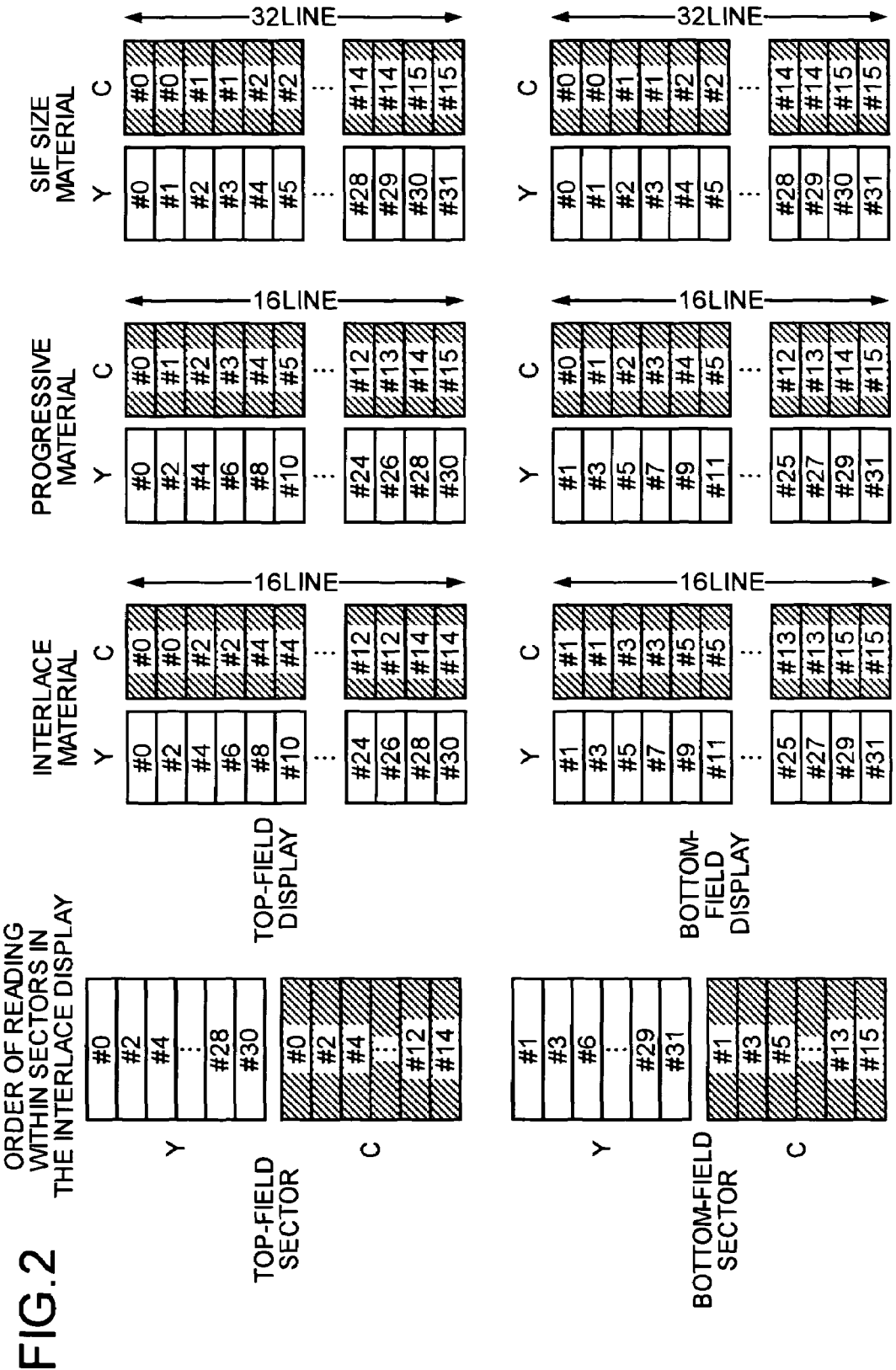
FIG. 2 is an illustration of an order in which display lines are read from sectors based on a frame attribute of the interlace display mode.
Figure 3:
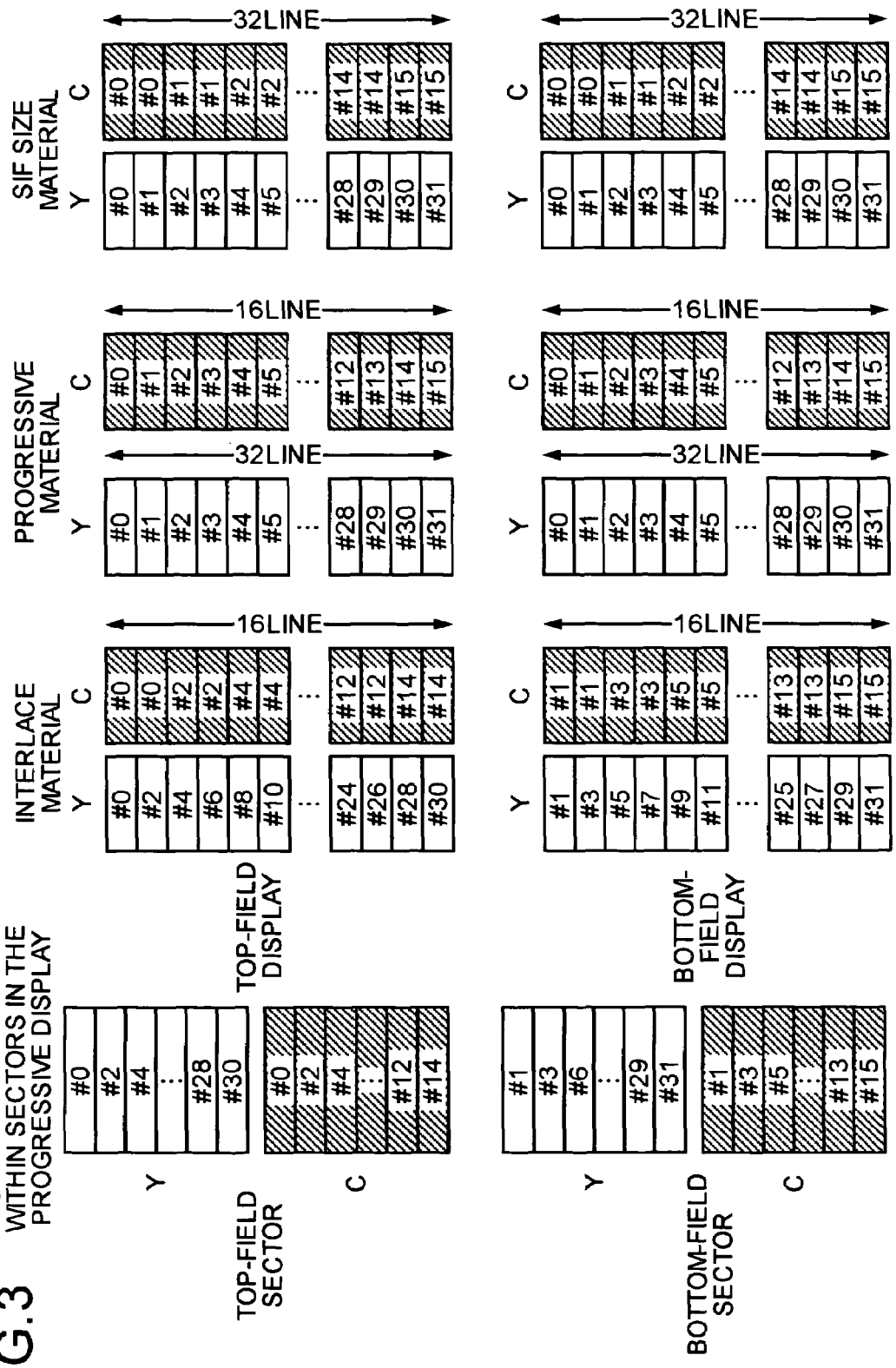
FIG. 3 is an illustration of order in which display lines are read from sectors based on a frame attribute of the progressive display mode.
Figure 4:
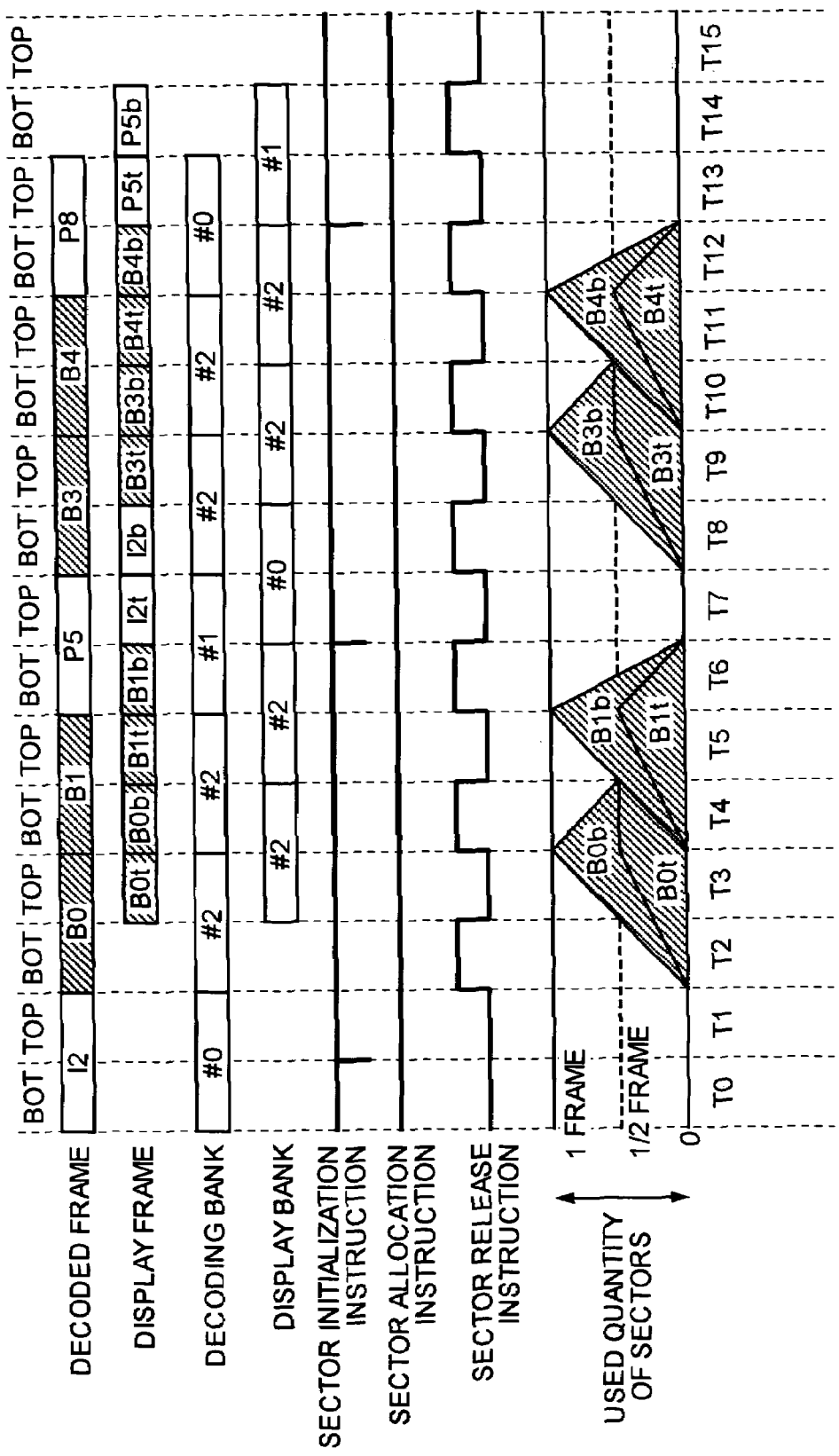
FIG. 4 is a time chart of the operation of the video decoding and displaying apparatus in a two-sector release mode, and also explains about a transition of a used quantity of sectors.

In the first operation example, a basic method of controlling the frame memory according to the present embodiment will be explained with reference to FIG. 1 to FIG. 4. FIG. 2 illustrates an order in which the video decoding and displaying apparatus shown in FIG. 1 reads display lines from sectors based on the frame attribute of the interlace display mode. FIG. 3 illustrates an order in which the video decoding and displaying apparatus shown in FIG. 1 reads display lines from sectors based on the frame attribute of the progressive display mode. FIG. 4 is a time chart of the operation of the video decoding and displaying apparatus shown in FIG. 1 in a two-sector release mode, and also explains about a transition of a used quantity of sectors.

The order of reading display lines from sectors based on the frame attribute of the interlace display mode will be explained with reference to FIG. 2. FIG. 2 shows the attributes of the decoded video frame for three cases of (a) the interlace material, (b) the progressive material, and (c) the SIF size material.

The video data includes a brightness component (hereinafter "Y component", and a color difference component (hereinafter "C component"). In FIG. 2, the top-field sector has the Y component for 16 lines including #0, #2, . . . , and

30, and has the C component for eight lines including #0, #2, ..., and #14. The bottom-field sector has the Y component for 16 lines including #1, #3, ..., and #31, and has the C component for eight lines including #1, #3, ..., and #15.

When the attribute of the decoded video frame is the interlace material, the frame-memory control-section 13 searches for two reading sectors for the top-field data and the bottom-field data respectively, but reads the Y component and the C component from only one sector during the display field period out of the corresponding two sectors. In other words, for the display of the top field, the frame-memory control-section 13 reads data from only the sector for the top-field data, and for the display of the bottom field, the frame-memory control-section 13 reads data from only the sector for the bottom-field data.

When the attribute of the decoded video frame is the progressive material, the frame-memory control-section 13 reads data of the Y component from only one sector during the display field period out of the corresponding two sectors, like when the attribute is the interlace material. However, the frame-memory control-section 13 reads data of the C component for each one line alternately from two sectors for the top-field data and the bottom-field data respectively.

When the attribute of the decoded video frame is the SIF size material, the frame-memory control-section 13 reads data of the Y component for each one line alternately from two sectors for the top-field data and the bottom-field data respectively. The frame-memory control-section 13 similarly reads-data of the C component for each one line alternately, but reads each line by two times repeatedly. When the attribute of the decoded video frame is the SIF size material, the frame-memory control-section 13 reads the same data for the top-field display and the bottom-field display respectively.

The order of reading display lines from sectors based on the frame attribute of the progressive display mode will be explained with reference to FIG. 3. FIG. 3 illustrates the attributes of the decoded video frame for three cases of the interlace material, the progressive material, and the SIF size material. Like in FIG. 2, in FIG. 3, the top-field sector has the Y component for 16 lines including #0, #2, ..., and #30, and has the C component for eight lines including #0, #2, ..., and #14. The bottom-field sector has the Y component for 16 lines including #1, #3, ..., and #31, and has the C component for eight lines including #1, #3, ..., and #15.

When the attribute of the decoded video frame is the interlace material and the SIF size material, the frame-memory control-section 13 reads the data of the Y component and the C component in the same order as that when the attribute of the decoded video frame is the interlace display shown in FIG. 2. When the attribute of the decoded video frame is the progressive material, the frame-memory control-section 13 reads data of the Y component and the C component for each one line alternately from two sectors for the top-field data and the bottom-field data respectively.

Next, the operation of the video decoding and displaying apparatus in which the frame-memory control-section 13 operates in the two-sector release mode will be explained with reference to FIG. 4. FIG. 4 illustrates a relationship between a "decoded frame", a "display frame", a "decoding bank", a "display bank", a "sector initialization instruction", a "sector allocation instruction", a "sector release instruction", and a "used quantity of sectors", for each of field periods from T0 to T15.

In the upper part of FIG. 4., "top" and "bot" denote field parities of a video output respectively. "I" denotes an Intra-coded frame (i.e., an I frame) that is encoded within a frame with no intra-frame predictive coding. "P" denotes a Predictive-coded frame (i.e., a P frame) that is intra-frame predictive coded in one direction. The P frame has an intra-frame predictive coding from the preceding I frame or P frame. "B" denotes a Bidirectional predictive-coded frame (i.e., a B frame) that is intra-frame predictive coded in both directions. The B frame has an intra-frame predictive coding from the preceding and following I frame or P frame.

A number (*) attached next to each of the I, P, and B denotes a display order of the frame. "I*t" and "I*b" denote a top field of the I* frame and a bottom field of the I* frame respectively. Similarly, "P*t" and "P*b" denote a top field of the P* frame and a bottom field of the P* frame respectively. Also, "B*t" and "B*b" denote a top field of the B* frame and a bottom field of the B* frame-respectively.

In the "decoded frame", the I2 frame is shown during the field periods T0 and T1, and the B0 frame is shown during the field periods T2 and T3. The B1 frame is shown during the field periods T4 and T5, and the P5 frame is shown during the field periods T6 and T7. The B3 frame is shown during the field periods T8 and T9, the B4 frame is shown during the field periods T10 and T11, and the P8 frame is shown during the field periods T12 and T13.

In the "display frame", the top field B0t and the bottom field B0b of the B0 frame are shown during the field periods T3 and T4. The top field B1t and the bottom field B1b of the B1 frame are shown during the field periods T5 and T6. The top field I2t and the bottom field I2b of the I2 frame are shown during the field periods T7 and T8. The top field B3t and the bottom field B3b of the B3 frame are shown during the field periods T9 and T10. The top field B4t and the bottom field B4b of the B4 frame are shown during the field periods T11 and T12. The top field P5t and the bottom field P5b of the P5 frame are shown during the field periods T13 and T14.

The "decoding bank" denotes a bank of the frame memory 14 into which the decoded frame is written. Therefore, the "decoding bank" is used corresponding to the "decoded frame". As shown in FIG. 4, as none of the B frames are used for the predictive video, all the B frames are instructed to be written into the bank #2. On the other hand, the I2 frames that are used for the predictive video are instructed to be written into the bank #0, and the P5 frames are instructed to be written into the bank #1.

The "display bank" denotes a bank from which the video data is read to carry out a display. In other words, the "display bank" is used corresponding to the "display frame". In the example shown in FIG. 4, at the time of displaying the I2 frame after displaying the B1 frame, the I2 frame is stored in the bank #0. Therefore, the bank #0 is instructed as the "display bank".

Specifically, the bank #2 is used during the field periods T3 and T4, and the bank #2 is used during the field periods T5 and T6. The bank #0 is used during the field periods T7 and T8. The bank #2 is used during the field periods T9 and T10. The bank #2 is used during the field periods T11 and T12, and the bank #1 is used during the field periods T13 and T14.

The "sector initialization instruction" is carried out at the starting time of the field period T1, the starting time of the field period T7, and the starting time of the field period T13 respectively. The "sector allocation instruction" is a control signal that is output from the sequencer 11 to the frame-memory control-section 13. The "sector allocation instruction" becomes at a "1" level during a field period when the decoded video is written into the frame memory 14, and becomes at a "0" level during a field period when the decoded video is not written into the frame memory 14. In FIG. 4, all the frames are decoded during every two field periods. Therefore, the "sector allocation instruction" is always at the "1" level.

When the "sector allocation instruction" is at the "1" level, the frame-memory control-section 13 searches the sector management table 1132 for a free sector, and writes the decoded video data into this free sector. At the same time, the frame-memory control-section 13 rewrites the state of the writing section into a busy state, and updates the writing video information such as the video position and the field parity, in the sector management table 1132.

The "sector release instruction" is a control signal that is output from the sequencer 11 to the frame-memory control-section 13. The "sector release instruction" is at the "0" level until immediately before the field period T2 when the decoding starts, and thereafter repeats the "1" level and the "0" level alternately during each field period.

The frame-memory control-section 13 releases the sector according to the "sector release instruction" in the dynamic mapping mode. Specifically, the "sector release instruction" changes at every one field period as shown in FIG. 4. During the field period when the "sector release instruction" is at the "1" level, the frame-memory control-section 13 releases the two sectors for the top-field data and the bottom-field data respectively at a point of time when the frame-memory control-section 13 displays and outputs all the data from the sector. On the other hand, during the field period when the "sector release instruction" is at the "0" level, the frame-memory control-section 13 does not release the sector, and holds the data in this sector.

The sector release instruction operation in the one-sector release mode and the sector release instruction operation in the two-sector release mode are different. The sequencer 11 controls the sector release instruction to release the sector during a last display field period of the display frame. The diagram of a transition of a used quantity of sectors shows separately for the top-field sector and the bottom-field sector, an increase and a decrease in used quantity of sectors during each field period in the decoding and display operations.

During the field period T2, the frame-memory control-section 13 decodes the B0 frame, and writes data into the bank #2. Therefore, along the progress in the decoding processing, the used number of sectors for the top-field B0$t$ and the bottom-field B0$b$ increases. At the end of the field period T2, a half of the decoding processing is carried out, and sectors for about one half frame are used.

During the next field period T3, the frame-memory control-section 13 decodes the data continuously from the field period T2, and displays the top field B0$t$ of the B0 frame. This top field B0$t$ is not in the last display field period of the B0 frame. Therefore, the "sector release instruction" is at the "0" level in the two-sector release mode. In other words, the frame-memory control-section 13 holds the sector without releasing it even after completing the reading. Consequently, at the end of the field period T3, the frame-memory control-section 13 completes the decoding of the B0 frame, and it becomes possible to use sectors for one frame.

During the next field period T4, the frame-memory control-section 13 decodes the next B1 frame, and at the same time, displays and outputs the bottom field B0$b$ of the B0 frame. This bottom field B0$b$ is in the last display field period of the B0 frame. Therefore, the "sector release instruction" becomes at the "1" level when the decoding of the B1 frame starts.

When the "sector release instruction" becomes at the "1" level, the frame-memory control-section 13 releases both the sector from which the reading of the bottom field B0$b$ is completed and the sector from which the reading of the top field B0$t$ is completed. Therefore, at the end of the field period T4, all the sectors that store the B0 frame are released.

Further, the frame-memory control-section 13 decodes the B1 frame by half, and executes the "sector allocation instruction". Therefore, at this point of time, sectors for one half frame are used. During the field period T5, the frame-memory control-section 13 decodes the B1 frame continuously from the field period T4, and displays and outputs the top field B1$t$ of the B1 frame.

This top field B1$t$ is not in the last display field period of the B1 frame. Therefore, the "sector release instruction" is at the "0" level in the two-sector release mode. In other words, the frame-memory control-section 13 holds the sector without releasing it even after completing the reading. Consequently, at the end of the field period T5, the frame-memory control-section 13 completes the decoding of the B1 frame, and it becomes possible to use sectors for one frame.

During the next field period T6, the frame-memory control-section 13 decodes the P5 frame, and at the same time, displays and outputs the bottom field B1$b$ of the B1 frame. This bottom field B1$b$ is in the last display field period of the B1 frame. Therefore, the "sector release instruction" becomes at the "1" level. Consequently, the frame-memory control-section 13 releases both the sector from which the reading of the bottom field B1$b$ is completed and the sector from which the reading of the top field B1$t$ is completed. As a result, at the end of the field period T6, all the sectors that store the B1 frame are released.

The bank into which the P5 frame is written is the bank #1. Therefore, the frame-memory control-section 13 does not carry out allocation to sectors in the bank #2 during the field period T6. Consequently, at the end of the field period T6, the number of busy sectors in the bank #2 is zero.

As explained above, in the two-sector release mode, the frame memory capacity for the bank #2 requires a region of at least one frame. However, it is possible to output the color difference signal of the image of the progressive material according to the original progressive format, and it is also possible to enlarge the SIF size picture, in the dynamic mapping mode. As a result, there is an effect that the picture quality in the dynamic mapping mode can be improved, as compared with the one-sector release mode.

Further, all the videos in the dynamic mapping mode can be decoded and displayed. Therefore, there is an effect that decoding and displaying in the dynamic mapping mode can be continued, even when the decoding video parameters change in the middle. This point becomes clear in various operation examples as explained below.

In the second operation example, the operation when the sector capacity of the bank #2 in the frame memory 14 is set to less than one frame will be explained. In this case, when the picture size of the input bit stream remains as the normal size, it is impossible to carry out a dynamic mapping in the two-sector release mode, and it is possible to carry out the operation only in the one-sector release mode.

However, the vertical size of the SIF size picture (352 pixels by 240 pixels) is a half of the normal size picture (740 pixels by 480 pixels). Therefore, even if the number of sectors in the bank #2 of the frame memory 14 is decreased to less than that for one frame, sectors corresponding to one frame of the SIF video can be secured.

Assume that the number of sectors in the bank #2 of the frame memory 14 is decreased to less than that for one frame. When the sector release mode is automatically switched to the two-sector release mode in the decoding and display of the SIF size picture when the picture size of the input bit stream is switched from the normal size to the SIF size in the middle, then the decoding and display processing in the dynamic mapping mode can be continued.

Figure 5:
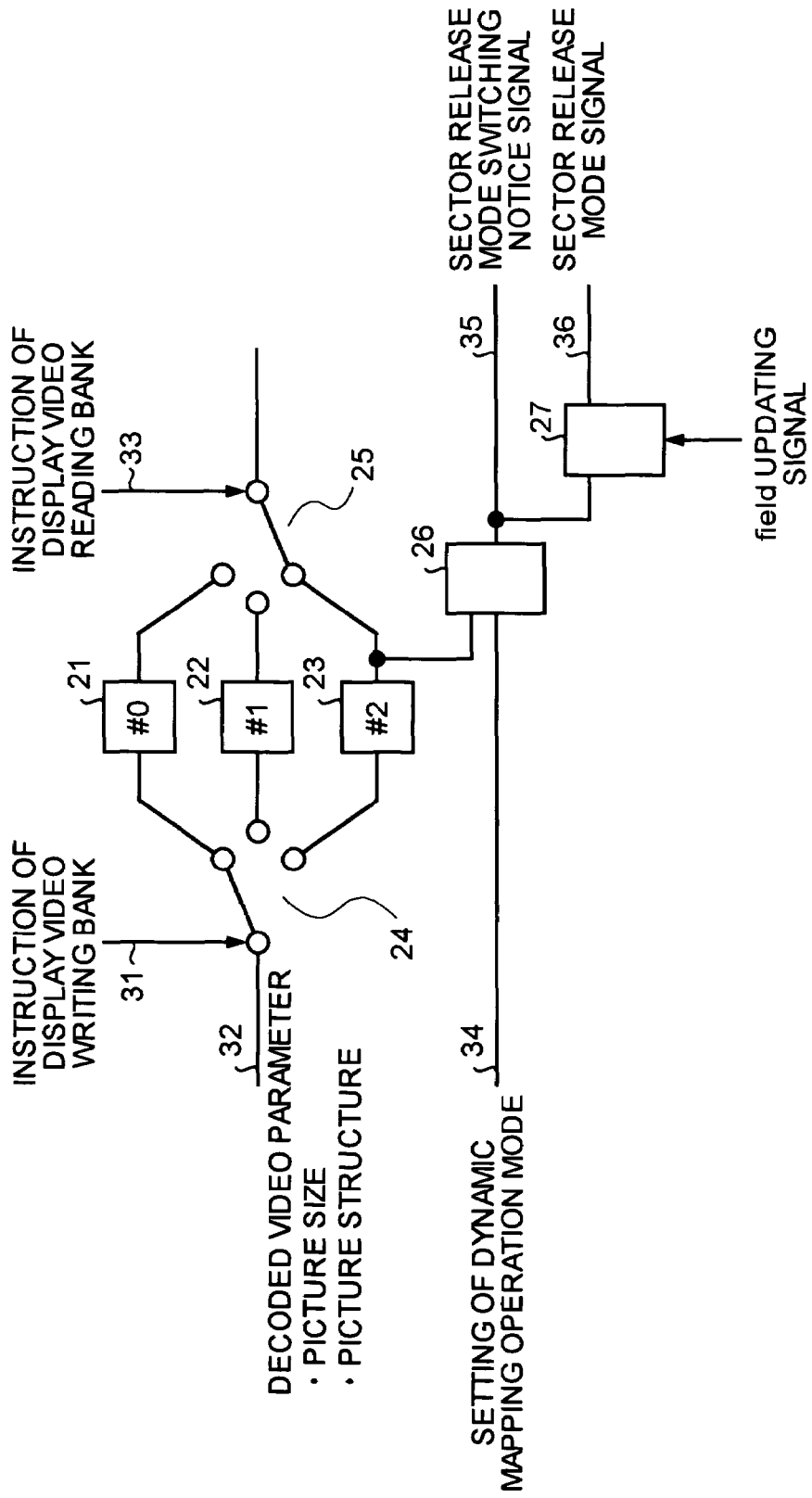
FIG. 5 is a block diagram of a sector release mode signal generating circuit that generates a sector release mode signal which is used to switch over decoded video parameters such as a picture size and a picture structure in the video decoding and displaying apparatus shown in FIG. 1.

In order to cope with a midway change in the decoded video parameters, the frame-memory control-section 13 has a sector release mode signal generating circuit having a structure as shown in FIG. 5, for example. FIG. 5 is a block diagram that shows an example structure of the sector release mode signal generating circuit that generates a sector release mode signal which is used to switch over decoded video parameters such as a picture size and a picture structure in the video decoding and displaying apparatus shown in FIG. 1. This circuit is also used to switch over a picture structure to be explained later in the third operation example. In the second operation example, the operation when the picture size is switched will be explained.

The sector release mode signal generating circuit shown in FIG. 5 comprises parameter holding circuits 21, 22, and 23, selectors 24 and 25, and logic circuits 26 and 27. The selector 24 selects one of the parameter holding circuits 21, 22, and 23 according to an instruction of a decoded video writing bank 31 from the sequencer 11. The selector 24 sends a decoded video parameter 32 from the video decoding-section 12, to the selected parameter holding circuit, thereby to make the circuit hold this parameter.

Based on this, at the decoding starting timing, the parameter holding circuit 21 holds the parameter for the bank #0 of the frame memory 14. The parameter holding circuit 22 holds the parameter for the bank #1 of the frame memory 14. The parameter holding circuit 23 holds the parameter for the bank #2 of the frame memory 14. The decoded video parameter 32 from the video decoding-section 12 includes a picture size and a picture structure. In the present example, it is assumed that the decoded video parameter 32 includes a picture size.

The selector 25 selects one of the parameter holding circuits 21, 22, and 23 according to an instruction of a display video reading bank 33 from the sequencer 11, and makes the selected parameter holding circuit output a held decoded video parameter held to the outside. When the parameter holding circuit 23 is selected, the parameter holding circuit 23 inputs the picture size parameter for the bank #2 held by this parameter holding circuit to one of input terminals of the logic circuit 26.

A dynamic mapping mode setting signal 34 out of operation modes provided from the outside is input to the other input terminal of the logic circuit 26. Based on this, the logic circuit 26 generates a sector release mode switching notice signal 35 that is switched at the starting timing of writing the decoded video into the bank #2, and outputs this signal 35 to the logic circuit 27.

The logic circuit 27 samples the sector release mode switching notice signal 35 when a field updating signal that is input to a sample clock input terminal becomes enable. The logic circuit 27 holds and outputs a sector release mode signal 36 for instructing any one of the one-sector release mode and the two-sector release mode.

Therefore, the sector release mode signal 36 that the logic circuit 27 outputs becomes a signal obtained by delaying the sector release mode switching notice signal 35 by one field.

In other words, the video written into the bank #2 is displayed one field period after the starting of the decoding. Therefore, it is possible to generate the sector release mode signal 36 to match the display timing of the decoded frame written in the bank #2.

The sequencer 11 changes the operation contents of the "sector release instruction" that is provided the frame-memory control-section 13 according to the change in the sector release mode signal 36. The frame-memory control-section 13 detects that the sector release mode signal 36 is switched over from the one-sector release mode to the two-sector release mode. Then, the frame-memory control-section 13 searches for two sectors for the top field and the bottom field as the sectors from which the video data are to be read, and reads the display data alternately from these two sectors as shown in the SIF size material in FIG. 2C. Accordingly, it is possible to read data which makes it possible to make an enlarged display of the SIF size picture.

Figure 6:
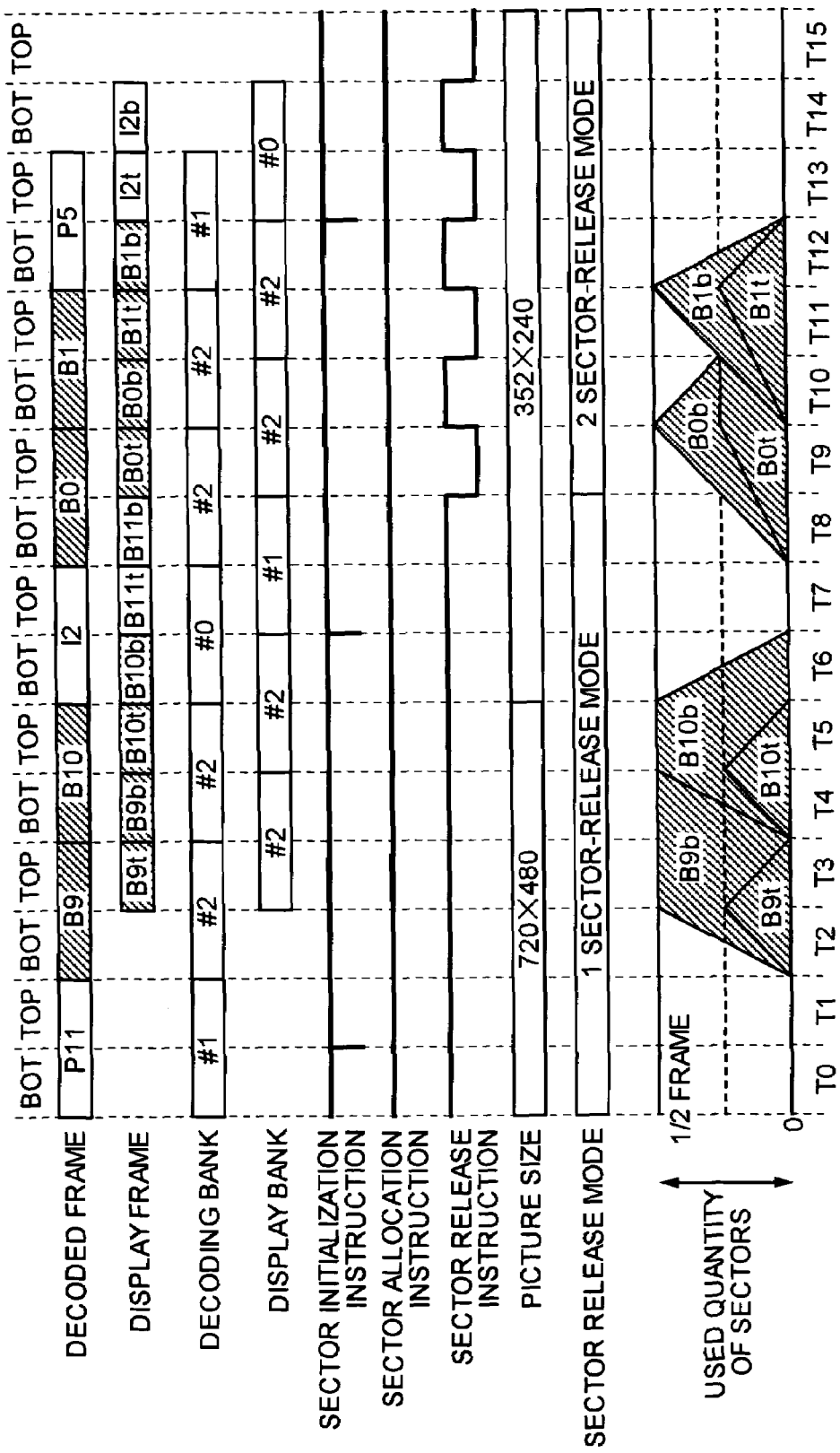
FIG. 6 is a time chart of the operation of switching over a picture size of an input bit stream from a normal size to an SIF size by using the sector release mode signal generating circuit shown in FIG. 5.

An example of the operation will be explained in detail below with reference to FIG. 6. FIG. 6 is a time chart that explains about an example of the operation of switching over a picture size of an input bit stream from the normal size (740 pixels by 480 pixels) to the SIF size (352 pixels by 240 pixels) by using the sector release mode signal generating circuit shown in FIG. 5.

FIG. 6 shows a relationship between a "decoded frame", a "display frame", a "decoding bank", a "display bank", a "sector initialization instruction", a "sector allocation instruction", a "sector release instruction", a "picture size", a "sector release mode", and a "used quantity of sectors", for each of the field periods from T0 to T15.

In the "decoded frame", the P11 frame is shown during the field periods T0 and T1, and the B9 frame is shown during the field periods T2 and T3. The B10 frame is shown-during the field periods T4 and T5, and the I2 frame is shown during the field periods T6 and T7. The B0 frame is shown during the field periods T8 and T9, the B1 frame is shown during the field periods T10 and T11, and the P5 frame is shown during the field periods T12 and T13.

In the "display frame", the top field B9t and the bottom field B9b of the B9 frame are shown during the field periods T3 and T4. The top field B10t and the bottom field B10b of the B10 frame are shown during the field periods T5 and T6. The top field P11t and the bottom field P11b of the P11 frame are shown during the field periods T7 and T8. The top field B0t and the bottom field B0b of the B0 frame are shown during the field periods T9 and T10. The top field B1t and the bottom field B1b of the B1 frame are shown during the field periods T11 and T12. The top field 12t and the bottom field 12b of the I2 frame are shown during the field periods T13 and T14.

The "decoding bank" is used corresponding to the "decoded frame". In other words, the bank #1 is used during the field periods T0 and T1, and the bank #2 is used during the field periods T2 and T3. The bank #2 is used during the field periods T4 and T5. The bank #0 is used during the field periods T6 and T7, and the bank #2 is used during the field periods T8 and T9. The bank #2 is used during the field periods T10 and T11, and the bank #1 is used during the field periods T12 and T13.

The "display bank" is used corresponding to the "display frame". In other words, the bank #2 is used during the field periods T3 and T4, and the bank #2 is used during the field periods T5 and T6. The bank #1 is used during the field periods T7 and T8. The bank #2 is used during the field periods T9 and T10, and the bank #2 is used during the field periods T11 and T12. The bank #0 is used during the field periods T13 and T14.

The "sector allocation instruction" is always at the "1" level. The "sector allocation instruction" is at the "1" level. The "sector release instruction" is at the "1" level until immediately before the field period T9 starts, and becomes at the "0" level during the field period T9. Thereafter, the "sector release instruction" repeats the "1" level and the "0" level alternately during each period.

The "picture size" is the normal size picture (740 pixels by 480 pixels) for three frames P11, B9, and B10 during the field periods from T0 to T5. The "picture size" is the SIF size picture (352 pixels by 240 pixels) for each frame starting from the fourth frame 12 that starts during the field period T6.

The "sector release mode" is the one-sector release mode during the field periods from T0 to T8, and is switched over to the two-sector release mode starting from the field period T9.

Based on the dynamic mapping, the writing of the decoded video into the bank #2 of the frame memory 14 starts from the second frame of the B9 frame. In other words, during the field period T2, the decoding of the B9 frame is executed, and the quantity of sectors used for the top field B9$t$ and for the bottom field B9$b$ increases respectively. At the end of the field period T2, about one half of the B9 frame is decoded, and the sector for about one half frame is used.

During the next field period T3, the B9 frame is decoded continuously, and the display of the top field B9$t$ of the B9 frame starts. Therefore, the display data is read from the top-field B9$t$ sector. As the mode is in the one-sector release mode when the "sector release instruction" is always at the "1" level, sectors from which the display data are read are released. Therefore, the quantity of sectors used for the top field B9$t$ of the B9 frame decreases, and becomes zero at the end of the field period T3. As the decoding of the B9 frame ends, the bottom field B9$t$ of the B9 frame is using sectors for one half frame.

During the field period T4, the decoding of the next B10 frame starts, and at the same time, the display of the bottom field B9$b$ of the B9 frame starts. Therefore, the sectors for the bottom field B9$b$ of the B9 frame are released, and the used quantity decreases. At the same time, the top field B10$t$ and the bottom field B10$b$ of the B10 frame are written. Therefore, the B9 frame uses no sector at the end of the field period T4, and the B10 frame is decoded up to about one half. Thus, about a half of the sectors are used.

During the field periods T5 and T6, the B10 frame is decoded and displayed. The B10 frame is written into the sectors in a similar manner to that of the B9 frame, and the sectors are released. At the end of the field period T6, used quantity of the sectors becomes zero.

During the field period T6, the decoding of the next I2 frame starts. The picture size is switched over to the SIF size picture (352 pixels by 240 pixels) starting from the I2 frame. After the picture size is switched over to the SIF size, the B0 frame is first written into the bank #2. At the start of the field period T8, the sector release mode switching notice signal 35 shown in FIG. 5 is generated, and the picture size information concerning the bank #2 is changed over. As a result, at the start of the field period T9, when the display of the B0 frame starts, the sector release mode signal 36 shown in FIG. 5 is switched over from the one sector release operation instruction to the two sector release operation instruction.

During the field period T8, the B0 frame starts to be written into the bank #2. There is no difference between the one-sector release mode and the two-sector release mode regarding the writing of the decoded video data. The top-field data and the bottom-field data are written into free sectors respectively.

During the next field period T9, the B0 frame is decoded continuously, and the top field B0$t$ of the B0 frame is displayed. When the sector release mode signal 36 changes from the one sector release operation instruction to the two sector release operation instruction, the sequencer 11 changes the "sector release instruction" during the field period T9 from the "1" level to the "0" level. As a result, during the field period T9, the sectors from which the top field B0$t$ is read for the display are not released, and are held until the display of the next bottom field B0$b$.

During this field period T9, the operation mode is switched over from the one-sector release mode to the two-sector release mode based on the sector release mode signal 36. Therefore, the frame-memory control-section 13 searches for two sectors for the top field and the bottom field as the sectors from which the video data are to be read, and reads the display data alternately from these two sectors as shown in the SIF size material in FIG. 2C.

Based on this, at the end of the field period T9, all the data of the B0 frame are held by using sectors for one half frame. Therefore, during the next field period T10, the display of the bottom field B0$b$ of the B0 frame starts, and the decoding of the B1 frame is also started.

This field period T10 is the last display field period of the B0 frame. Therefore, the "sector release instruction" becomes at the "1" level simultaneously with the start of the decoding of the B1 frame. Based on this, the display is progressed while releasing the sectors for the top field B0$t$ and the bottom field B0$b$ of the B0 frame that have been read.

In other words, the sectors are released at a speed two times faster than that in the one-sector release mode. At the same time, the writing of the decoded video of the B1 frame starts, and free sectors are used to write the decoded video. The operations during the field periods T11 and T12 are similar to the writing and displaying of the B0 frame during the field periods T9 and T10. At the end of the field period T12, all the sectors are released, and the used quantity of sectors becomes zero.

When the SIF size picture handled in the second operation example is the SIF size of the NTSC, the vertical picture size is 240 pixels. Therefore, when one sector stores 16 lines, it is necessary to have a capacity of an odd number of 15 sectors. However, in the present embodiment, the 16 lines of the last macro block lines are held by dividing the lines into eight lines for the top-field data sector and the bottom-field data sector respectively. Therefore, 16 sectors are necessary.

In the last sector, data are stored for each eight lines. When the number of lines per one sector is 16, the reading of the one frame data for the display is completed upon ending the reading of the stored eight lines for each sector. In the normal case, the data reading from sectors is completed when the number of read lines reaches the stored number of lines.

However, when the sectors are in an odd number, it is determined that the reading from the sectors is not completed yet, and the sectors are not released. Therefore, it is necessary to recognize the completion of the reading from the sectors that are not fully used, based on other method.

The following method of controlling the release instruction signal is adopted this purpose. When a value obtained by dividing the vertical pixel size by the number of lines stored in one sector becomes an odd number, the sectors are released when the reading of data from the two sectors storing the top-field data and the bottom-field data of the last macro block lines becomes such that the count number of lines read for the display becomes a half of the reading lines per one sector.

Based on this, even when the number of macro block lines in the vertical direction is an odd number like in the SIF size picture of the NTSC, and also when the last macro block in the vertical direction is stored in only a half of sectors, an enlarged video in the dynamic mapping mode can be displayed.

In the third operation example, the operation when a picture structure of a decoded frame changes from a frame structure to a field structure will be explained. A video of the field structure has a structure that a top field and a bottom field are separated, unlike the video of the frame structure handled in the first and second operation examples. A vertical picture size of the video of the field structure becomes a half of that of the frame structure handled in the first and second operation examples. One field video of the top field or the bottom field is decoded during one field period.

When this picture structure is switched over, the parameter holding circuits 21, 22, and 23 of the sector release mode signal generating circuit shown in FIG. 5 hold the parameter of the picture structure. At the same time, the mode switching is carried out in synchronism with the display timing.

Figure 7:
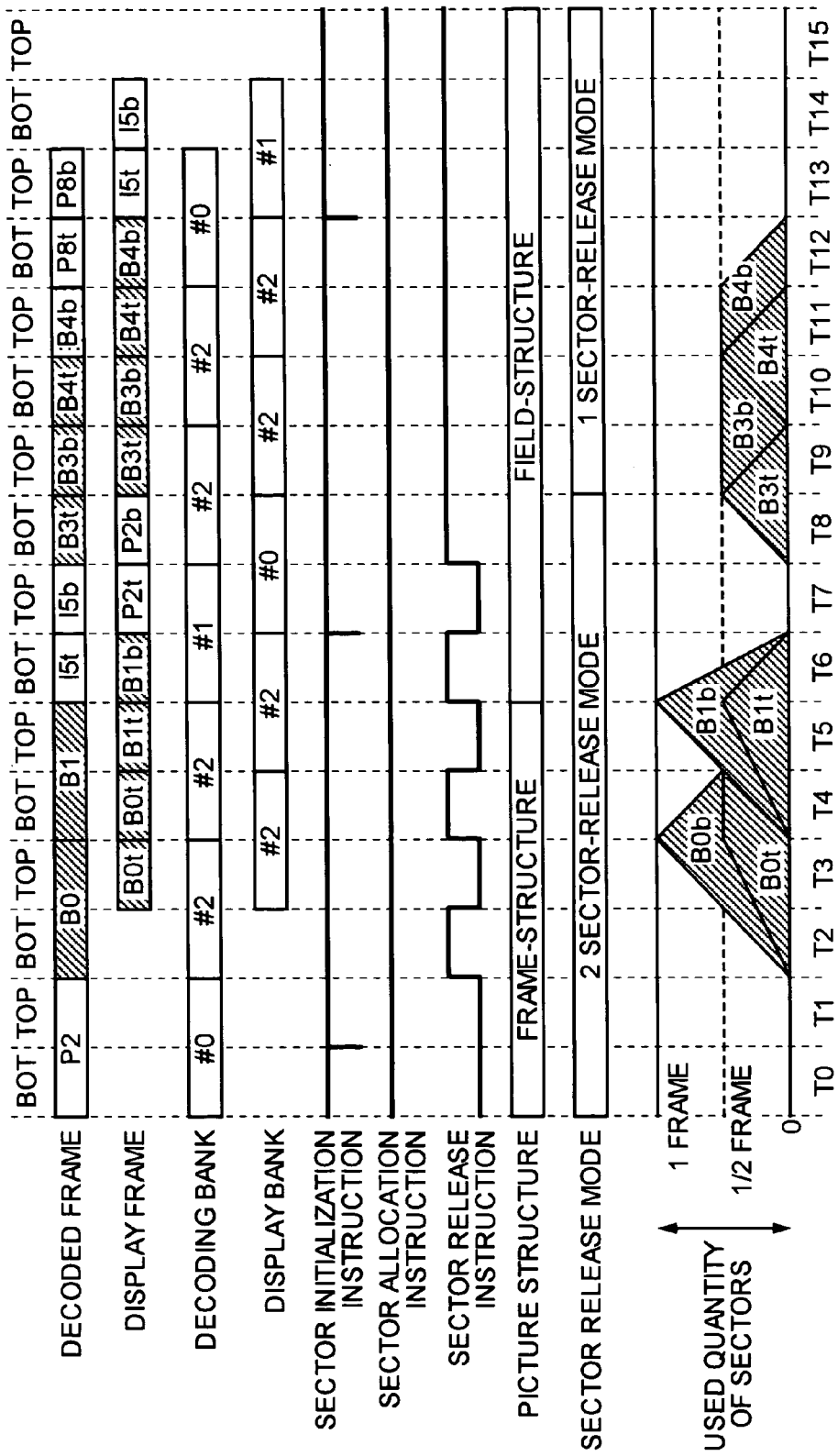
FIG. 7 is a time chart of the operation of the video decoding and displaying apparatus when there is a change in the picture structure in the decoded frames.

The operation will be explained in detail below with reference to FIG. 7. FIG. 7 shows a time chart that explains about an example of the operation that the video decoding and displaying apparatus shown in FIG. 1 carries out when there is a change in the picture structure in the decoded frames. FIG. 7 illustrates the third operation example when the picture structure changes from the frame structure to the field video during the two-sector release mode operation.

FIG. 7 illustrates a relationship between a "decoded frame", a "display frame", a "decoding bank", a "display bank", a "sector initialization instruction", a "sector allocation instruction", a "sector release instruction", a "picture structure", a "sector release mode", and a "used quantity of sectors", for each of the field periods from T0 to T15.

In the "decoded frame", the P2 frame is shown during the field periods T0 and T1, and the B0 frame is shown during the field periods T2 and T3. The B1 frame is shown during the field periods T4 and T5. The top field 15*t* and the bottom field 15*b* of the 15 frame are shown during the field periods T6 and T7. The top field B3*t* and the bottom field B3*b* of the B3 frame are shown during the field periods T8 and T9. The top field B4*t* and the bottom field B4*b* of the B4 frame are shown during the field periods T10 and T11. The top field P8*t* and the bottom field P8*b* of the P8*b* frame are shown during the field periods T12 and T13.

In the "display frame", the top field B0*t* and the bottom field B0*b* of the B0 frame are shown during the field periods T3 and T4. The top field B1*t* and the bottom field B1*b* of the B1 frame are shown during the field periods T5 and T6. The top field P2*t* and the bottom field P2*b* of the P2 frame are shown during the field periods T7 and T8. The top field B3*t* and the bottom field B3*b* of the B3 frame are shown during the field periods T9 and T10. The top field B4*t* and the bottom field B4*b* of the B4 frame are shown during the field periods T11 and T12. The top field 15*t* and the bottom field 15*b* of the 15 frame are shown during the field periods T13 and T14.

The "decoding bank" is used corresponding to the "decoded frame". In other words, the bank #0 is used during the field periods T0 and T1, and the bank #2 is used during the field periods T2 and T3. The bank #2 is used during the field periods T4 and T5. The bank #1 is used during the field periods T6 and T7, and the bank #2 is used during the field periods T8 and T9. The bank #2 is used during the field periods T10 and T11, and the bank #0 is used during the field periods T12 and T13.

The "display bank" is used corresponding to the "display frame". In other words, the bank #2 is used during the field periods T3 and T4, and the bank #2 is used during the field periods T5 and T6. The bank #0 is used during the field periods T7 and T8. The bank #2 is used during the field periods T9 and T10, and the bank #2 is used during the field periods T11 and T12. The bank #1 is used during the field periods T13 and T14.

The "sector allocation instruction" is always at the "1" level. The "sector release instruction" is at the "0" level until immediately before the field period T2 when the decoding starts. Thereafter, the "sector release instruction" repeats the "1" level and the "0" level alternately during each field period until immediately before the field period T8 starts. The "sector release instruction" becomes at the "1" level during the field period T8, and thereafter holds the "1" level during each field period.

The "picture structure" is the frame structure for the three frames of P2, B0, and B1 during the field periods from T0 to T5, and is the field structure during the field period T6 and thereafter. Therefore, the "decoded frame" shows the top field 15*t* in the 15 frame during the field period T6, and shows the bottom field 15*b* in the 15 frame during the field period T7. The "decoded frame" shows a similar pattern during the subsequent field periods from T8 to T13.

The "sector release mode" is the two-sector release mode during the field periods from T0 to T8, and is switched over to the one-sector release mode starting from the field period T9. The "used quantity of sectors" shows two cases of the one frame and the one-half frame.

In FIG. 7, the operations for the frame P2, B0 and B1 during the field period up to T6 are similar to those explained in the first operation example. The operation when the video changes to the next video of the field structure will be explained next. Each frame starting from the next 15 frame up to B3, B4, and P8 is the video of the field structure.

The decoding of the next 15 frame starts during the field period T6. The picture structure is switched over from the frame structure to the field structure in the 15 frame. After the picture structure is switched over from the frame structure to the field structure, the B3 frame is first written into the bank #2. At the start of the field period T8, the sector release mode switching notice signal 35 shown in FIG. 5 is generated, and the picture structure concerning the bank #2 is switched over. As a result, at the start of the field period T9 when the display of the B3 frame starts, the sector release mode signal 36 shown in FIG. 5 is switched over from the two sector release operation instruction to the one sector release operation instruction.

During the field period T8, the decoding of the top field B3*t* of the B3 frame starts, and the decoded video data of the top field B3*t* is written into the sectors of the bank #2. At the end of the field period T8, sectors for one half frame are in used.

During the next field period T9, the top field B3*t* decoded during the field period T8 is displayed. At the same time, the bottom field B3*b* is decoded. The sector release mode is switched over to the one-sector release mode starting from the field period T9. Therefore, the frame-memory control-section 13 searches for only one sector that stores the top field B3*t* of the B3 frame, and reads this data, in order to display the top field B3*t*.

As the "sector release instruction" from the sequencer 11 becomes at the "1" level, the frame-memory control-section 13 releases the read sectors. The frame-memory control-section 13 also stores the decoded bottom field B3*b* of the B3 frame into free sectors. As a result, at the end of the field period T9, the reading of the top field B3*t* is completed, and the decoding of the bottom field B3*b* is completed. Therefore, the bottom field B3*b* is using sectors for one half frame.

During the next field period T10, the bottom field B3*b* of the B3 frame is displayed, and the top field B4*t* of the next B4 frame is decoded. During this field period T10, the frame-memory control-section 13 similarly searches for the bottom field B3*b* of the B3 frame, and releases the sectors after the reading. At the same time, the frame-memory control-section 13 writes the decoded video data of the top field B4*t* of the B4 frame into free sectors.

Similarly, the frame-memory control-section 13 decodes and displays data of the top field B4*t* of the B4 frame. During the field period T12, the frame-memory control-section 13 displays data of the bottom field B4*b* of the B4 frame, and releases sectors. Therefore, the used number of sectors becomes zero at the end.

In short, when the field structure is input, the top field and the bottom field are decoded during separate field periods. Therefore, in the two-sector release mode, it is not possible to find a pair of sectors for the top-field data and the bottom-field data.

However, as explained above, it is possible to automatically detect a change to the field structure, and it is possible to switch over the dynamic mapping mode from the two-sector release mode to the one-sector release mode by matching the timing with the display switching. Therefore, the operation using the bank #2 in the dynamic mapping mode can be continued. In other words, it is possible to decode and display the video data that includes both the frame structure and the field structure, in the dynamic mapping mode.

In the fourth operation example, a frame rate conversion processing such as 3:2 pull-down processing will be explained. In this frame rate conversion processing, the capacity of the bank #2 of the frame memory 14 is set to at least one frame. A video decoding and displaying apparatus operates in the two-sector release mode. The video decoding-section 12 detects a change of a frame rate in the process of a decoding processing, and notifies the change to the frame-memory control-section 13. The frame-memory control-section 13 notifies the same to the sequencer 11.

Figure 8:
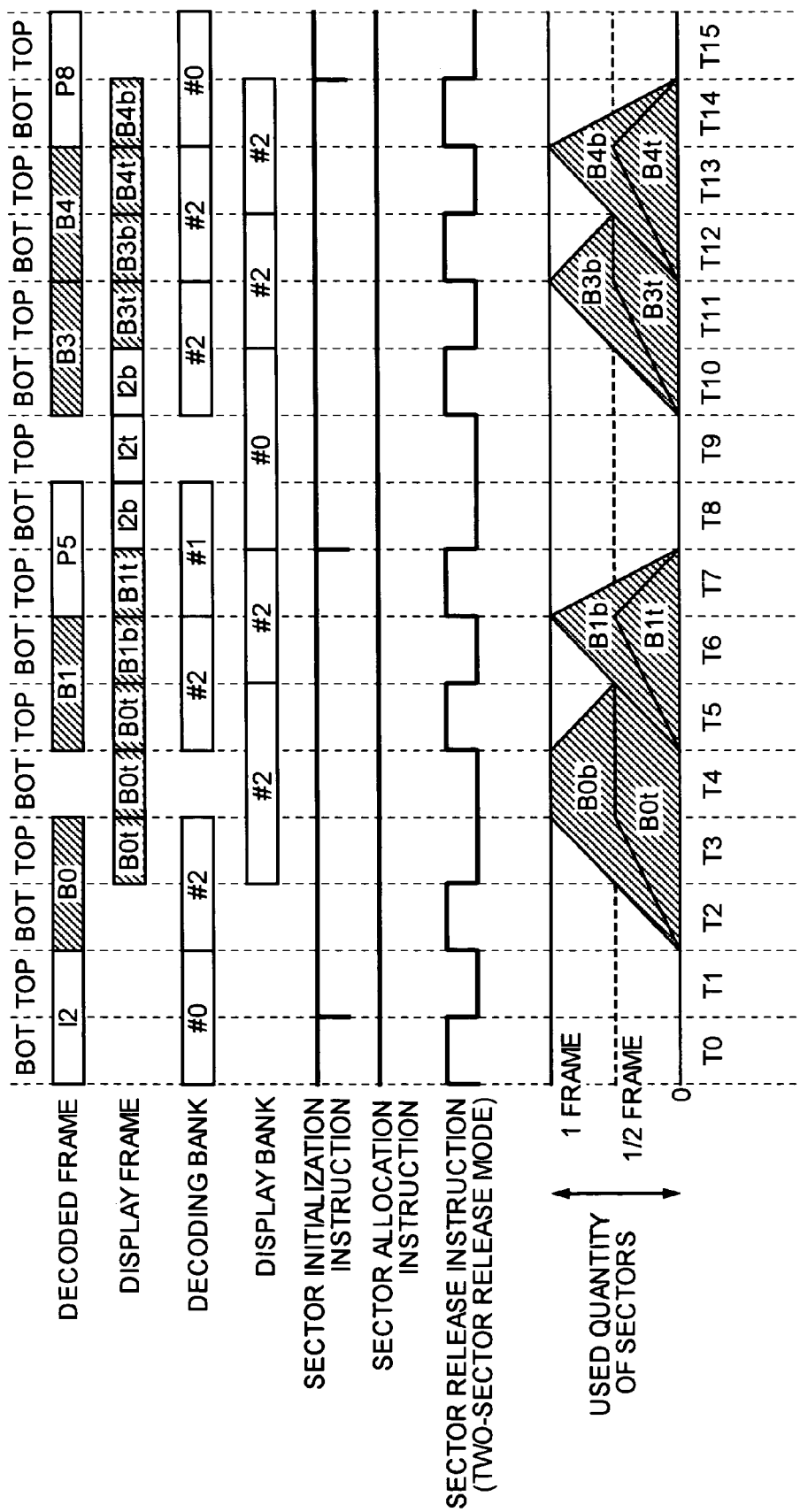
FIG. 8 is a time chart of the operation of the video decoding and displaying apparatus to convert a frame rate during the operation in the two-sector release mode.

The operation will be explained in detail below with reference to FIG. 8. FIG. 8 is a time chart that explains about an example of the operation that the video decoding and displaying apparatus shown in FIG. 1 carries out to convert a frame rate during the operation in the two-sector release mode.

FIG. 8 illustrates a relationship between a "decoded frame", a "display frame", a "decoding bank", a "display bank", a "sector initialization instruction", a "sector allocation instruction", a "sector release instruction (the two-sector release mode)", and a "used quantity of sectors", for each of the field periods from T0 to T15.

In the "decoded frame", the I2 frame is shown during the field periods T0 and T1, and the B0 frame is shown during the field periods T2 and T3. By leaving the field period T4 as a blank, the B1 frame is shown during the field periods T5 and T6. The P5 frame is shown during the field periods T7 and T8. By leaving the field period T9 as a blank, the B3 frame is shown during the field periods T10 and T11. The B4 frame is shown during the field periods T12 and T13. The P5 frame is shown during the field periods T14 and T15.

In the "display frame", the top field B0*t*, the bottom field B0*b*, and the top field B0*t* of the B0 frame are shown during the field periods T3, T4 and T5. The bottom field B1*b* and the top field B1*t* of the B1 frame are shown during the field periods T6 and T7. The bottom field 12*b*, the top field 12*t*, and the bottom field 12*b* of the I2 frame are shown during the field periods T8, T9, and T10. The top field B3*t* and the bottom field B3*b* of the B3 frame are shown during the field periods T11 and T12. The top field B4*t* and the bottom field B4*b* of the B4 frame are shown during the field periods T13 and T14.

The "decoding bank" is used corresponding to the "decoded frame". In other words, the bank #0 is used during the field periods T0 and T1, and the bank #2 is used during the field periods T2 and T3. By leaving the field period T4 as a blank, the bank #2 is used during the field periods T5 and T6. The bank #1 is used during the field periods T7 and T8. By leaving the field period T9 as a blank, the bank #2 is used during the field periods T10 and T11. The bank #2 is used during the field periods T12 and T13, and the bank #0 is used during the field periods T14 and T15.

The "display bank" is used corresponding to the "display frame". In other words, the bank #2 is used during the field periods T3, T4, and T5, and the bank #2 is used during the field periods T6 and T7. The bank #0 is used during the field periods T8, T9, and T10. The bank #2 is used during the field periods T11 and T12, and the bank #2 is used during the field periods T13 and T14.

The "sector allocation instruction" is always at the "1" level. The "sector release instruction" is in the two-sector release mode. Therefore, the "sector release instruction" repeats the "1" level and the "0" level alternately during each field period. However, the "sector release instruction" is at the "0" level continuously during the two field periods of the field periods T3 and T4, and the field periods T8 and T9 respectively. The "used quantity of sectors" shows two cases of the one frame and the one-half frame.

In FIG. 8, the operation up to the field period T3 is similar to that in the first operation example. However, the B0 frame that is first written into the bank #2 during the field period T3 is the frame that is displayed during three field periods. Therefore, the top field B0*t*, the bottom field B0*b*, and the top field B0*t* are displayed during the field periods from T4 to T6. This is because of the frame rate conversion. This operation is carried out in order to display 24 frames during 30 frame display periods.

It is controlled such that the decoding of the next frame that is carried out during the display of the frames displayed during the three field periods starts during the last display field period. In other words, in the first operation example, the decoding of the next B1 frame starts and at the same time, the sectors are released during the field period T4. However, in the fourth operation example, the sequencer 11 controls to start decoding the next B1 frame during the field period T5 as the last display field period of the B0 frame. At the same time, the sequencer 11 maintains the "sector release instruction" at the "0" level during the field period T4, and sets the "sector release instruction" to the "1" level during the field period T5 when the decoding of the next B1 frame starts.

Therefore, during the field period T4, sectors for one frame are used, and both the decoded top-field data and bottom-field data are held. During the field period T5, the two sectors for the top field and the bottom field that have been read for the display during the last display field period are released at the same time.

During the field period T5, the decoded video data of the B1 frame is written into free sectors. The B1 frame is the frame for the displaying two field periods. Therefore, sectors are released based on a control similar to that in the first operation example.

As explained above, in the fourth operation example, the number of sectors in the bank # is set to at least one frame like in the first operation example, and the operation is carried out in the two-sector release mode. Therefore, it becomes possible to carry out a 3:2 pull-down frame rate conversion processing. In this case, even when the frame to be converted (i.e., the B0 frame in the above example) is that of a progressive material, it becomes possible to read from the two sectors in the order of the lines shown in FIG. 2B and FIG. 3B. Consequently, it becomes possible to carry out an optimum display.

Figure 9:
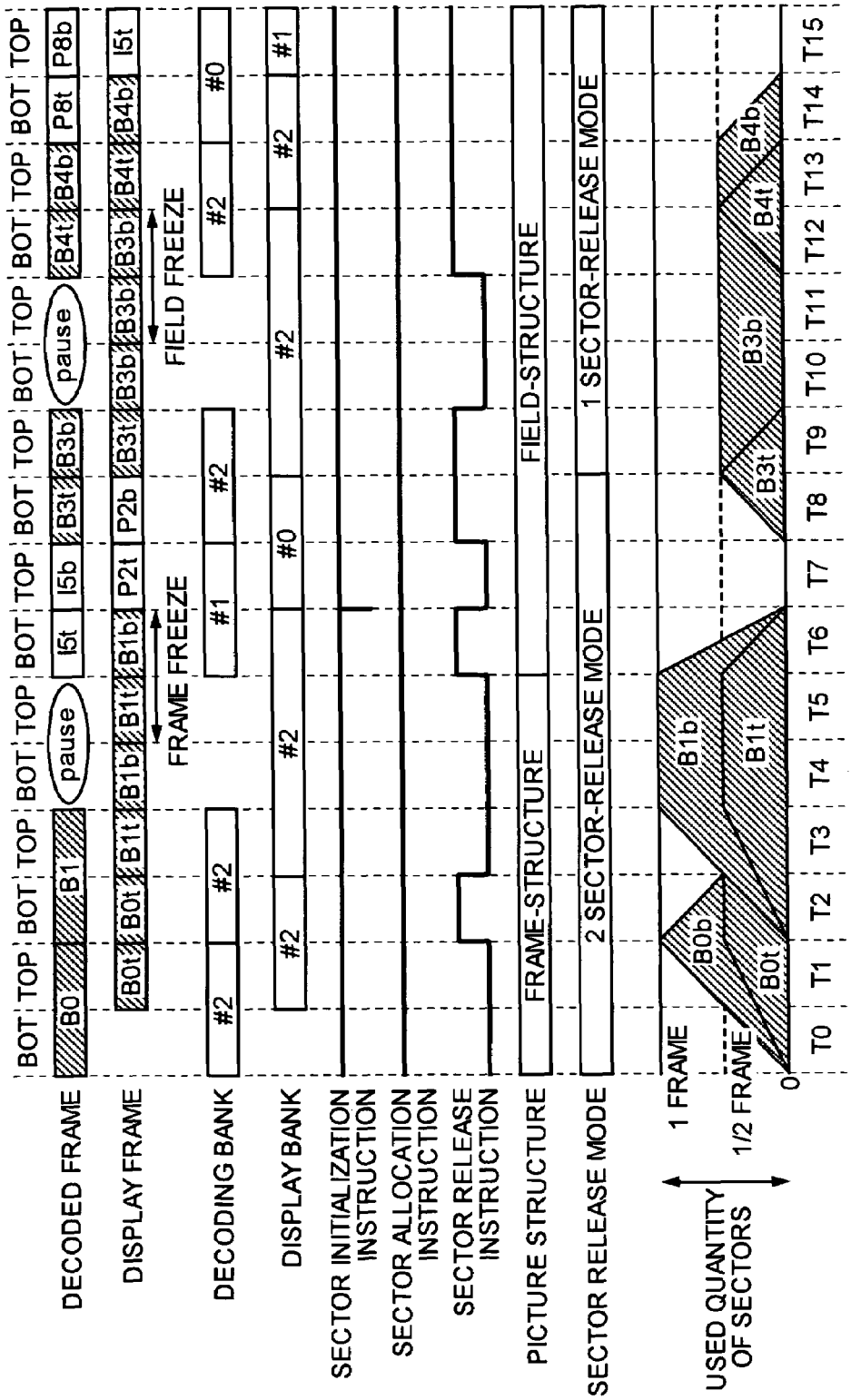
FIG. 9 is a time chart of the operation of the video decoding and displaying apparatus when a pause processing is carried out.

A pause processing will be explained next as the fifth operation example. The pause processing can be carried out during the operation both in the one-sector release mode and the two-sector release mode. At least one frame is necessary for the frame memory capacity in the bank #2. The operation will be explained in detail below with reference to FIG. 9. FIG. 9 is a time chart that explains about an example of the operation that the video decoding and displaying apparatus shown in FIG. 1 carries out when the pause processing is carried out.

FIG. 9 shows a relationship between a "decoded frame", a "display frame", a "decoding bank", a "display bank", a "sector initialization instruction", a "sector allocation instruction", a "sector release instruction", a "picture structure", a "sector release mode", and a "used quantity of sectors", for each of the field periods from T0 to T15.

In the "decoded frame", the B0 frame is shown during the field periods T0 and TI, and the B1 frame is shown during the field periods T2 and T3. A pause is input during the field periods T4 and T5. The top field 15t and the bottom field 15b of the 15 frame are shown during the field periods T6 and T7. The top field B3t and the bottom field B3b of the B3 frame are shown during the field periods T8 and T9. A pause is input during the field periods T10 and T11. The top field B4t and the bottom field B4b of the B4 frame are shown during the field periods T12 and T13. The top field P8t and the bottom field P8b of the B8 frame are shown during the field periods T14 and T15.

In the "display frame", the top field B0t and the bottom field B0b of the B0 frame are shown during the field periods T1 and T2. The top field B1t and the bottom field B1b of the B1 frame are shown during the field periods T3 and T4. The B1 frame of the B1 frame is frozen during the field periods T5 and T6. The top field P2t and the bottom field P2b of the P2 frame are shown during the field periods T7 and T8. The top field B3t and the bottom field B3b of the B3 frame are shown during the field periods T9 and T10. The bottom field B3b of the B3 frame is frozen during the field periods T11 and T12. The top field B4t and the bottom field B4b of the B4 frame are shown during the field periods T13 and T14.

The "decoding bank" is used corresponding to the "decoded frame". In other words, the bank #2 is used during the field periods T0 and T1, and the bank #2 is used during the field periods T2 and T3. By leaving the field periods T4 and T5 as a blank, the bank #1 is used during the field periods T6 and T7. The bank #2 is used during the field periods T8 and T9. By leaving the field periods T10 and T11 as a blank, the bank #2 is used during the field periods T12 and T13. The bank #0 is used during the field periods T14 and T15.

The "display bank" is used corresponding to the "display frame". In other words, the bank #2 is used during the field periods T1 and T2, and the bank #2 is used during the field periods from T3 to T6. The bank #0 is used during the field periods T7 and T8. The bank #2 is used during the field periods from T9 to T12, and the bank #2 is used during the field periods T13 and T14.

The "sector allocation instruction" is always at the "1" level. The "sector release instruction" is at the "0" level during the field periods T0 and T1, and is at the "1" level during the field period T2. The "sector release instruction" is at the "0" level during the field periods from T3 to T5, and is at the "1" level during the field period T6. The "sector release instruction" is at the "0" level during the field period T7, and is at the "1" level during the field periods T8 and T9. The "sector release instruction" is at the "0" level during the field periods T10 and T11, and is at the "1" level during the field period T12 and thereafter.

The "picture structure" is the frame structure during the field periods from T0 to T5, and is the field structure during the field period T6 and thereafter. Therefore, the sector release signal generating circuit shown in FIG. 5 is used.

The "sector release mode" is the two-sector release mode during the field periods from T0 to T5, and is the one-sector release mode during the field period T6 and thereafter. The "used quantity of sectors" shows two cases of the one frame and the one-half frame.

In the fifth operation example, the decoding operation is paused during the field periods from T10 to T11. When the decoding is paused, the updating of the display frame is also paused after one field period in synchronism with this pausing. Therefore, in the fifth operation example, the updating of the display frame is paused during the field periods T5 and T6 and during the field periods T11 and T12 after one field period respectively.

In this case, at the end of the field period T3, the writing of the decoded video data into the B1 frame of the bank #2 is completed. Therefore, the sectors for one frame hold both the top field B1t and the bottom field B1b. During the next field period T4, the bottom field B1b of the B1 frame is displayed.

In this case, when the decoding operation is not paused, the field period T4 is the last display field period of the B1 frame. Therefore, the "sector release instruction" is set to the "1" level, and the sectors from which the field data are read for the display are sequentially released. However, in the present example, the field periods T4 and T5 are the periods for pausing the decoding. Therefore, the field period T4 does not become the last display field period. In this case, the last display field period becomes the field period T6 when the pause is canceled.

Therefore, during the field period T4, the "sector release instruction" is maintained at the "0" level in synchronism with the pause of the decoding. In the next field period T5, the "sector release instruction" is also maintained at the "0" level. In the next field period T6, the "sector release instruction" is set to the "1" level.

As a result, both data in the top field B1t and the bottom field B1b of the B1 frame are held in the bank #2 during the field periods T4 and T5. Upon cancellation of the pause, the decoding of the 15 frame starts during the field period T6. In synchronism with this, the sectors from which the data are read for the display are released at the same time.

In this way, as shown in FIG. 9, the B1 frame is displayed continuously during the field periods T5 and T6 after the field period T4. Specifically, the top field B1*t* of the B1 frame is displayed during the field period T5, and the bottom field B1*b* is displayed during the field period T6.

According to this method, both data of the top field and the bottom field are held during the display period of the field periods T3, T4, T5, and T6. Therefore, even when the B1 frame of which display is frozen is a progressive material, it is possible to read the lines shown in FIG. 2B and FIG. 3B. Consequently, when the display is frozen, the picture quality can be enhanced.

The decoded video changes from a video of the frame structure to a video of the field structure in the next I5 frame. In this case, as explained in the third operation example, the sector release mode is compulsively changed from the two-sector release mode to the one-sector release mode during the field period T9 when the data is first written into the first bank #2 after the frame structure changes to the field structure.

When the mode changes to the one-sector release mode, the "sector release instruction" is maintained at the "1" level during the field period T9. After the top field B3*t* of the B3 frame is displayed, the top field B3*t* is released. The bottom field B3*b* of the B3 frame is displayed during the next field period T10.

However, the decoding operation is paused based on the pause, during the field period T10 and T11. Therefore, during the field period T10, the "sector release instruction" is set to the "0" level in synchronism with the pause of the decoding. During the next field period T11, the "sector release instruction" is maintained at the "0" level. Upon cancellation of the pause, during the field period T12, the "sector release instruction" is set to the "1" level.

Based on this, the bottom field B3*b* of the B3 frame is held in the bank #2 during the field periods T10 and T11. Therefore, the bottom field B3*b* is continuously displayed, or frozen, during the field periods T11 and T12 after the field period T10. During the field period T12, the decoding of the top field B4*t* of the B4 frame starts. In synchronism with this, the sectors that store the bottom field B3*b* of the B3 frame from which the data for the display is read are released.

As explained above, whether the release mode is the one-sector release mode or the two-sector release mode is monitored. Based on this, it becomes possible to select whether the freeze processing is the frame freezing or the field freezing. Consequently, it is possible to display all videos in an optimum state.

In the sixth operation example, an inverse reproduction of a motion picture according to the dynamic mapping mode will be explained. To realize the inverse reproduction in the decoding and displaying of the digital video compressed data as represented by the MPEG-2 or the like, a part of the compressed video data is input repeatedly into the video decoding apparatus by a plurality of number of times, thereby to carry out the decoding. When the data is compressed by using the intra-frame predictive coding, it is necessary to hold the frames before and after the decoded frame into the frame memory in order to extract the predictive video.

Therefore, in the inverse reproduction of the moving picture in the dynamic mapping mode, two frame memories out of the three frame memories 14 are used to hold predictive videos in the forward and backward directions. The rest of one frame memory is used to hold the display frame. In this case, the frame memory of the bank #2 that operates in the dynamic mapping mode is used as the frame memory for the display frame.

As explained above, at the time of changing the reproduction from the normal reproduction to the inverse reproduction by selectively using the three frame memories, when the last display bank in the normal reproduction is other than the bank #2, it is necessary to move the frame memory other than the bank # 2 to the bank #2 that is the display bank for the inverse reproduction. Hereinafter, this move is called a data copying function. When the operation is being carried out in the dynamic mapping mode, in the copying to the bank #2, whether the operation mode of the dynamic mapping after the copying becomes the one-sector release mode or the two-sector release mode is determined based on the attribute of the copied frame.

When the copying is carried out in the one-sector release mode, only the data that is necessary in the display operation until when the reproduction changes to the inverse reproduction of any one of the top field and the bottom field is copied. On the other hand, when the copying is carried out in the two-sector release mode, it is necessary to copy both data of the top field and the bottom field. The order of reading the data stored in the sector after the copying, and the contents updated in the sector management table also change.

Figure 10:
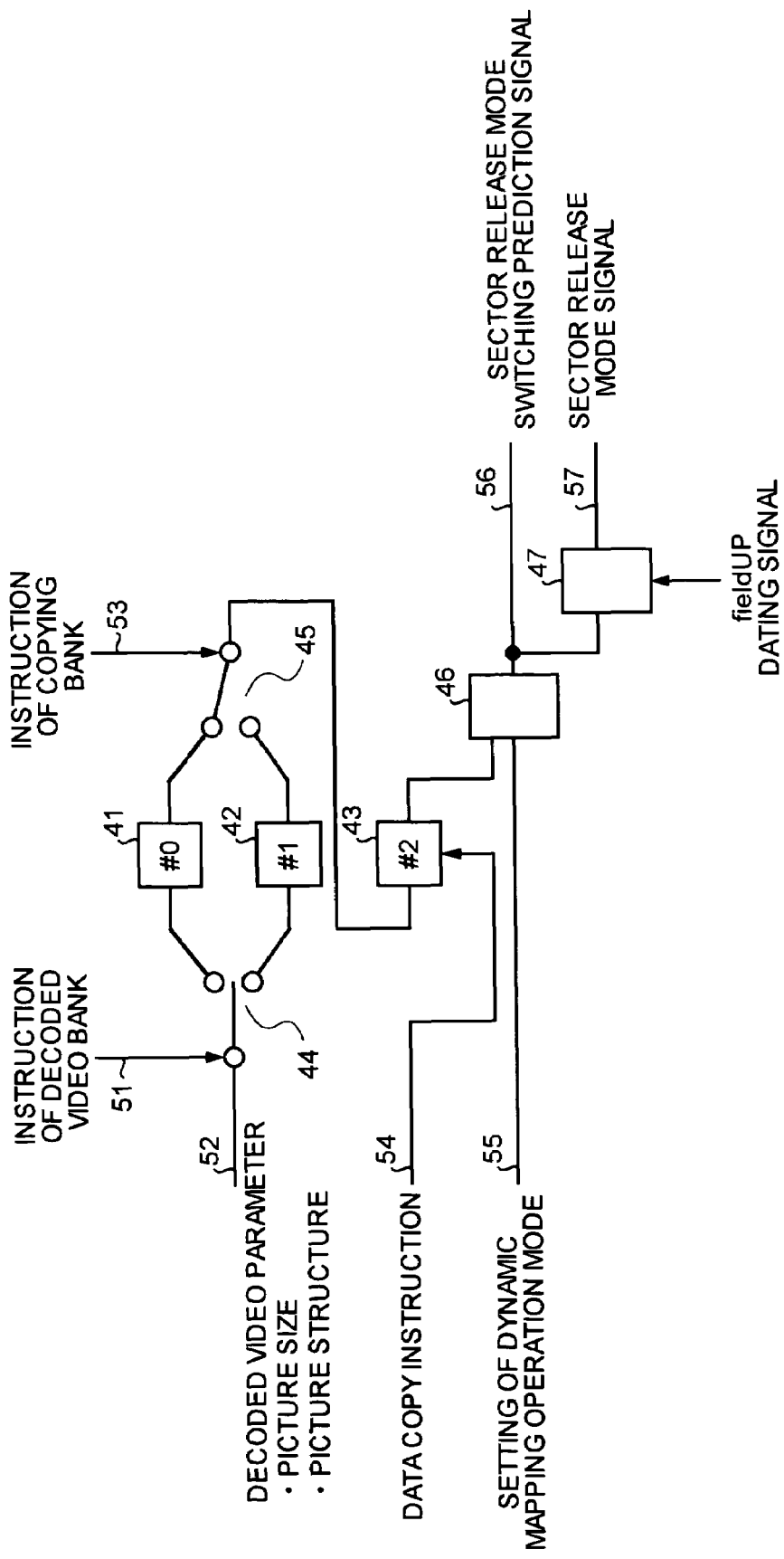
FIG. 10 is a block diagram of a sector release mode signal generating circuit that generates a sector release mode signal which is used to recognize a change in the attributes of the video when the normal reproduction of a motion picture changes to a reverse reproduction in the video decoding and displaying apparatus shown in FIG. 1.

By using the sector release mode signal generating circuit shown in FIG. 10, a data copying executing circuit (not shown) and a sector control circuit (not shown) of the frame-memory control-section 13 are able to decide the dynamic mapping operation mode of the bank #2 after copying the data. FIG. 10 is a block diagram that shows an example structure of the sector release mode signal generating circuit that generates a sector release mode signal which is used to recognize a change in the attributes of the video when the normal reproduction of a motion picture changes to the reverse reproduction in the video decoding and displaying apparatus shown in FIG. 1.

The sector release signal generating circuit shown in FIG. 10 comprises parameter holding circuits 41, 42, and 43, selectors 44 and 45, and logic circuits 46 and 47. The selector 44 selects one of the parameter holding circuits 41 and 42 according to an instruction of a decoded video writing bank 51 from the sequencer 11. The selector 44 sends a decoded video parameter 52 from the video decoding-section 12 to the selected parameter holding circuit, and makes this circuit hold the parameter 52. The decoded video parameter 52 includes a picture size and a picture structure.

At the decoding starting timing for the normal reproduction, the parameter holding circuit 41 holds the parameter of the bank #0 of the frame memory 14. The parameter holding circuit 42 holds the parameter of the bank #1 of the frame memory 14. The parameter holding circuit 43 holds the parameter of the bank #2 of the frame memory 14.

The data copying executing circuit receives an inverse reproduction instruction, provides an instruction of a copying bank 53 that instructs a bank from which the copying is carried out, to the selector 45, and provides a data copying instruction 54 to the parameter holding circuit 43. In other words, the selector 45 selects one of the parameter holding circuits 41 and 42, and sends a decoded video parameter held by the selected parameter holding circuit to the parameter holding circuit 43. Then, the attribute parameter of the video frame is copied to the parameter holding circuit 43.

The video parameter for the bank #2 held by the parameter holding circuit 43 is applied to one input terminal of the logic circuit 46. A dynamic mapping mode setting signal 55 is input to the other input terminal of the logic circuit 46, out of operation mode instructions provided from the outside to the sequencer 11. Based on this, the logic circuit 46 generates a sector release mode switching prediction signal 56 that is switched over in synchronism with the generation timing of the data copying instruction 54. The logic circuit 46 outputs this signal 56 to the logic circuit 47, and also outputs the same signal to the frame-memory control-section 13 and the data copying executing circuit.

The logic circuit 47 samples the sector release mode switching prediction signal 56 when the field updating signal input to the sample clock input terminal is enabled. The logic circuit 47 holds and outputs a sector release mode signal 57 that instructs any one of the one-sector release mode and the two-sector release mode. Therefore, the sector release mode signal 57 is switched over one field period after the field period when the sector release mode switching prediction signal 56 is switched over. The sector release mode signal 57 is output to the sequencer 11 and the frame-memory control-section 13.

The sector release mode switching prediction signal 56 reflects a result of copying the parameter. Therefore, this signal 56 shows a mode to which the sector management of the bank #2 after the copying shifts. Thus, the data copying executing circuit refers to the sector release mode switching prediction signal 56, and determines whether the data to be copied is for a single field or both fields. The data copying executing circuit copies the video data to the bank #2 in the determined order of storing the data. At the same time, the frame-memory control-section 13 rewrites the data in the sector management table 1132 (refer to FIG. 11) based on the sector release mode switching prediction signal 56. The sequencer 11 and the frame-memory control-section 13 receive the sector release mode signal 57, and carry out the same operation as explained in the second operation example and the third operation example.

Thus, it becomes possible to shift from the normal reproduction to the inverse reproduction in the dynamic mapping mode, even when there is a change in the attribute of the video.

As explained above, according to the present invention, when the sector capacity of the frame memory is greater than or equal to that required for one frame of video data to be displayed, the sector that stores the top-field data and the sector that holds the bottom-field data are simultaneously released during the last display field period of the display video. Consequently, it is possible to continuously execute the decoding and display of the video data of all attributes in a dynamic mapping mode. Further, as a display mode of the original video is realized, the picture quality is improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A video decoding and displaying apparatus comprising:
a managing unit that partitions a frame memory into a plurality of sectors, wherein the frame memory stores decoded video data of a frame not used as a predicted video, the decoded video data including a top-field data and a bottom-field data;
a write control unit that writes the top-field data and the bottom-field data of the decoded video data into separate free sectors of the frame memory; and
a read control unit that, at the time of displaying decoded video data by reading it from the frame memory, simultaneously releases, during a last display field period of a display video, the sector that stores the top-field data and the sector that stores the bottom-field data when the sector capacity of the frame memory is equal to or greater than that required for one frame of video data to be displayed,
wherein the decoded video data includes two video data of different picture sizes, and also when the sector capacity of the memory frame is less than that required for one frame of the video data of a larger picture size,
the read control unit releases one corresponding sector out of a sector that stores top-field data which has been read and a sector which stores bottom-field data during each display field period, in a reading and a displaying of the video data of the larger picture size, and
simultaneously releases the sector that stores top-field data and the sector that stores bottom-field data during a last display field period, in a reading and a displaying of the video data of a smaller picture size.

2. A video decoding and displaying apparatus comprising:
a managing unit that partitions a frame memory into a plurality of sectors, wherein the frame memory stores decoded video data of a frame not used as a predicted video, the decoded video data including a top-field data and a bottom-field data;
a write control unit that writes the top-field data and the bottom-field data of the decoded video data into separate free sectors of the frame memory; and
a read control unit that, at the time of displaying decoded video data by reading it from the frame memory, simultaneously releases, during a last display field period of a display video, the sector that stores the top-field data and the sector that stores the bottom-field data when the sector capacity of the frame memory is equal to or greater than that required for one frame of video data to be displayed,
wherein the read control unit executes the release upon completing the reading of data corresponding to a number of written lines, when a value obtained by dividing a vertical pixel size of the video data by the number of storage lines of sectors that store the video data of a displayed frame becomes an odd number.

3. A video decoding and displaying apparatus comprising:
a managing unit that partitions a frame memory into a plurality of sectors, wherein the frame memory stores decoded video data of a frame not used as a predicted video, the decoded video data including a top-field data and a bottom-field data;
a write control unit that writes the top-field data and the bottom-field data of the decoded video data into separate free sectors of the frame memory; and
a read control unit that, at the time of displaying decoded video data by reading it from the frame memory, simultaneously releases, during a last display field period of a display video, the sector that stores the top-field data and the sector that stores the bottom-field data when the sector capacity of the frame memory is equal to or greater than that required for one frame of video data to be displayed,
wherein the decoded video data includes video data of a frame structure and video data of a field structure, the read control unit simultaneously releases the sector that stores top-field data and the sector that stores bottom-field data during a last display field period, in a reading and a displaying of the video data of the frame structure, and releases one corresponding sector out of the sector that stores top-field data which has been read and the sector which stores bottom-field data during each display field period, in a reading and a displaying of the video data of the field structure.

4. A video decoding and displaying apparatus comprising:

a managing unit that partitions a frame memory into a plurality of sectors, wherein the frame memory stores decoded video data of a frame not used as a predicted video, the decoded video data including a top-field data and a bottom-field data;

a write control unit that writes the top-field data and the bottom-field data of the decoded video data into separate free sectors of the frame memory;

a read control unit that, at the time of displaying decoded video data by reading it from the frame memory, simultaneously releases, during a last display field period of a display video, the sector that stores the top-field data and the sector that stores the bottom-field data when the sector capacity of the frame memory is egual to or greater than that required for one frame of video data to be displayed, an attribute holding unit that holds an attribute of the decoded video data of a frame not used as a predictive video;

a release mode generating unit that receives a setting of a dynamic mapping mode, refers to the attribute held in the attribute holding unit, and generates a sector release signal for assigning one of a one-sector release mode for releasing one sector and a two-sector release mode for releasing two sectors; and a control unit that controls the release of sectors, following the sector release mode signal.

5. A video decoding and displaying apparatus comprising:

a managing unit that partitions a frame memory into a plurality of sectors, wherein the frame memory stores decoded video data of a frame not used as a predicted video, the decoded video data including a top-field data and a bottom-field data;

a write control unit that writes the top-field data and the bottom-field data of the decoded video data into separate free sectors of the frame memory;

a read control unit that, at the time of displaying decoded video data by reading it from the frame memory, simultaneously releases, during a last display field period of a display video, the sector that stores the top-field data and the sector that stores the bottom-field data when the sector capacity of the frame memory is equal to or greater than that required for one frame of video data to be displayed, an attribute holding unit that holds attributes of the decoded video data for two kinds of frames that are used as a predictive video during a normal reproduction;

a switching unit that switches over a storage state in the frame memory, based on the attribute in the attribute holding unit, at the time of shifting a reproduction from a normal reproduction to an inverse reproduction;

a release mode generating unit that receives a setting of a dynamic mapping mode, refers to the attribute in the attribute holding, and generates a sector release signal for assigning one of a one-sector release mode for releasing one sector and a two-sector release mode for releasing two sectors; and a control unit that controls the release of the sectors, following the sector release mode signal.

* * * * *